(12) United States Patent
Ohba

(10) Patent No.: US 6,631,457 B1
(45) Date of Patent: Oct. 7, 2003

(54) SURFACE COMPUTER AND COMPUTING METHOD USING THE SAME

(75) Inventor: Akio Ohba, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 343 days.

(21) Appl. No.: 09/703,071

(22) Filed: Oct. 31, 2000

(30) Foreign Application Priority Data

Nov. 1, 1999 (JP) .......................................... 11-311157

(51) Int. Cl.[7] ................................................ G06F 9/26
(52) U.S. Cl. ...................... 711/200; 711/168; 712/11; 345/505; 345/506
(58) Field of Search ................................ 711/200, 168; 712/10, 17; 345/571, 572, 573, 505, 506

(56) References Cited

U.S. PATENT DOCUMENTS

| | | | |
|---|---|---|---|
| 4,051,551 A | | 9/1977 | Lawrie et al. |
| 4,811,210 A | * | 3/1989 | McAulay .................... 710/317 |
| 4,891,751 A | * | 1/1990 | Call et al. ...................... 712/6 |
| 4,907,148 A | * | 3/1990 | Morton ........................ 712/22 |
| 4,975,843 A | * | 12/1990 | Brunnett et al. ................ 378/4 |
| 5,038,386 A | * | 8/1991 | Li .............................. 382/302 |
| 5,193,202 A | * | 3/1993 | Jackson et al. ............. 709/100 |
| 5,524,223 A | * | 6/1996 | Lazaravich et al. ......... 712/241 |
| 5,692,210 A | * | 11/1997 | Mita et al. .................. 345/502 |
| 5,781,195 A | * | 7/1998 | Marvin ....................... 345/428 |
| 5,794,016 A | * | 8/1998 | Kelleher ..................... 345/505 |
| 6,266,733 B1 | * | 7/2001 | Knittel et al. .................. 711/5 |
| 6,460,127 B1 | * | 10/2002 | Akerib ........................ 712/10 |
| 6,532,017 B1 | * | 3/2003 | Knittel et al. ............... 345/506 |

OTHER PUBLICATIONS

Sanguinetti, "Micro–Analysis of the Titan's Operational Pipe," pp 190–196, ACM, 1988.*
Sato et al., "Fast Image Generation of Constructive Solid Geometry Using A Cellular Array Processor," pp 95–102, ACM, 1985.*
Fuchs et al., "Pixel–Planes 5: A Heterogeneous Mulitprocessor Graphics System Using Processor–Enhanced Memories," pp 79–88, ACM, 1989.*
Bajwa et al., "A Massively Parallel, Micro–grained VLSI Architecture," pp 250–255, 1994.*
M. Auguin et al., "Parallel Memory Management in a SIMD Computer", Highly Parallel Computers. Proceedings of the IFIP WG 10.3 Working Conference on Highly Parallel Computers for Numerical and Signal Processing Applications, Sophia Antipolis, France, Mar. 24–26, 1986, pp. 97–110.

* cited by examiner

Primary Examiner—Matthew Kim
Assistant Examiner—Stephen Elmore
(74) Attorney, Agent, or Firm—Lerner, David, Littenberg, Krumholz & Mentlik, LLP

(57) ABSTRACT

A surface computer includes an address generator for generating an address for adjusting surface region data concerning at least a storage region and a concurrent computer, provided at a subsequent stage of the address generator, having a plurality of unit computers.

29 Claims, 21 Drawing Sheets

SURFACE COMPUTER AND COMPUTING METHOD USING THE SAME

FIELD OF THE INVENTION

The present invention relates to a surface computer and a computing method capable of performing fast computation in various types of complex computations, such as physical computation, environmental computation, behavior computation, computations for emotional expressions and the like by concurrently computing computation data contained in a two-dimensional region in units of two-dimensional regions.

BACKGROUND OF THE INVENTION

Recently, various fields of natural science and engineering have remarkably progressed. In natural science and engineering, large-scale physical computation is required. For example, large-scale matrix computation must be performed in the fields of space development projects, fluid dynamics, and quantum mechanics. When such computation is desired to be performed at high speed, a computer must be optimized.

Conventional computers, particularly personal computers, have progressed enough to exceed outdated general-purpose computers (so-called "mainframes").

However, it is difficult for such personal computers to perform the above-described large-scale computation at high speed, or the personal computers take a long time to carry out the above computations. As reasons which prevent the personal computers from performing the large-scale computation at high speed, delays in data transfer speed, data processing speed, and the like which occur in the computers can be considered.

Therefore, among developers, researchers, and the like who must perform the above large-scale physical computations, computers which can perform large-scale computation at high speed have long been desired.

SUMMARY OF THE INVENTION

Accordingly, it is an object of the present invention to provide a computer having a novel architecture and a computing method using the same capable of performing large-scale computation at high speed.

To this end, according to a first aspect of the present invention, there is provided a surface computer including an address generator for generating an address for adjusting surface region data concerning at least a storage region and a concurrent computer, provided at a subsequent stage of the address generator, having a plurality of unit computers.

According to a second aspect of the present invention, a surface computer includes an address generator for generating an address for adjusting surface region data concerning at least a storage region, a concurrent computer, provided at a subsequent stage of the address generator, having a plurality of unit computers and a storage unit connected to the concurrent computer.

According to a third aspect of the present invention, a surface computer includes an address generator for generating an address for adjusting surface region data concerning at least a storage region, and a concurrent computer, provided at a subsequent stage of the address generator, having a plurality of unit computers, wherein the region specified by an operand constituting an instruction word is a line.

According to a fourth aspect of the present invention, a surface computer includes an address generator for generating an address for adjusting surface region data concerning at least a storage region, and a concurrent computer, provided at a subsequent stage of the address generator, having a plurality of unit computers, wherein the region specified by an operand constituting an instruction word is a surface region extending two-dimensionally.

According to a fifth aspect of the present invention, a surface computer includes a data bus, having a large bus width, allowing a processing block and a storage block formed in one chip to be connected therebetween. In the surface computer, the processing block includes an address generator for generating an address for adjusting surface region data concerning a storage region and a concurrent computer, provided at a subsequent stage of the address generator, having a plurality of unit computers, and the storage block includes DRAM.

According to a sixth aspect of the present invention, in a surface computer includes an address generator, a processing block having a concurrent computer comprising a plurality of unit computers, a storage block, a data bus having a large bus width and allowing the processing block and the storage block to be connected therebetween, the computing method includes an address generating step for causing the address generator to generate an address for adjusting surface region data concerning a storage region, and a processing step for causing the concurrent computer to process the surface region data.

DESCRIPTION OF THE PREFERRED EMBODIMENTS

Figure 1:
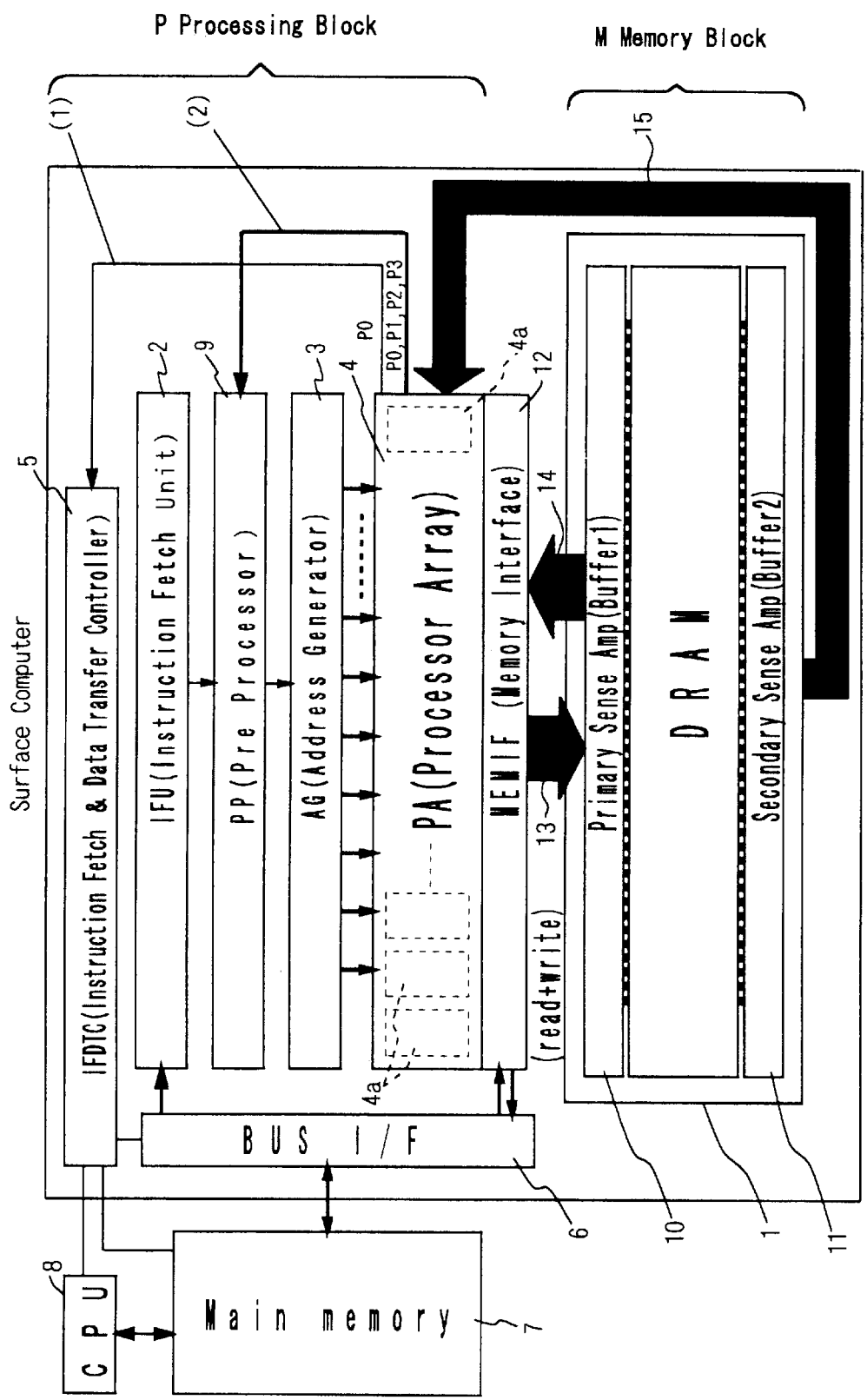
FIG. 1 is a block diagram of the construction of a surface computer according to the present invention.

Embodiments of a surface computer and a computing method using the same according to the present invention are described with reference to the attached drawings. When elements are identical, they have the same reference numeral and a repeated description thereof is omitted.

Design Ideas of Surface Computer

FIG. 1 shows the overall construction of the surface computer according to the present invention. The basic design of the surface computer is performed on the basis of the following design ideas.

(1) A processing block and a memory block are formed on one chip using a semiconductor manufacturing method, which is used in ASIC-DRAM (Application Specified Integrated Circuit-Dynamic Random Access Memory).

In the past, in typical processors, the processing block and the memory block have been discretely formed. Therefore, memory access from the processing block to the memory block during processing was a performance bottleneck. However, improvement in recent semiconductor manufacturing technology led to an embedded or mixed LSI (Large-Scale Integration) in which the processing block and the memory block are integrated on one chip. Since the distance between the processing block and the memory block is shortened by integrating both blocks in the one chip, the speed of the data transfer can be accelerated, which solves the foregoing memory access problem.

ASIC originally meant a special-purpose semi-customized integrated circuit. However, recently ASIC-DRAM primarily means a DRAM/logic integrated semiconductor element, which is in great demand as a custom integrated circuit, or it means the manufacturing process therefor.

(2) An internal data bus having a large data-bus width allows the processing block and the memory block to be interconnected therebetween.

On the basis of experience, when physical computation is performed at high speed, the data transfer speed between the memory block and the processing block is expected to be a performance bottleneck more frequently than the processing speed of the processing block. To avoid the bottleneck due to the data transfer speed, the data bus width of the data bus that is used for data transfer between the processing block and the memory block is designed to be large.

(3) The processing block uses a construction which enables surface region data to be handled as data so that a certain quantity of data may be handled at a time.

The concept of the "surface region data" (that is, data represented by any geometric (2D, 3D, etc.) surface for any type of data which can be depicted or represented as a geometric surface) means a set of computation data which exists in a surface region. Accordingly, the concept of the "surface computer" is a computer that specifies surface region data based on a surface or a surface region, manipulates (i.e., reads data from memory and writes data to it) and performs computing processing. Since the surface computer processes surface region data, which is a group of data having a certain large quantity, processed data itself has the concept of concurrence or parallelism. That is, the data has a structure capable of being processed in parallel.

When the surface computer is developed on the basis of the above design ideas, the processing speed of the processing block is expected to relatively be a performance bottleneck by constructing the data bus between the processing block and the memory block so that the width of the bus is sufficiently large. Therefore, in order to avoid the problem due to the processing speed of the processing block, by using data to be processed as surface region data, a large number of data groups is transferred once or several times and is processed in units of data groups. By setting the data bus width of the surface computer to be large, transfer of the surface region data can be performed.

The surface computer according to the present invention includes a processor array having a plurality of unit computers in the processing block so that such a certain large quantity of data can be efficiently processed.

Hereinafter, the concrete construction of the surface computer based on the above design ideas is described.

Construction of Surface Computer and Operations of Each Component Thereof (Construction of Surface Computer)

FIG. 1 shows the overall construction of the surface computer according to the present invention. The surface computer shown in FIG. 1 is roughly dividied into a processing block P and a memory block M. As described above, a conventional processing block and a conventional memory block have been discretely formed. However, this surface computer has the processing block P formed in a manner which is dedicated to the DRAM and which takes advantage of the ASIC-DRAM. Thus, the surface computer is constructed having the processing block P and the memory block M formed on one-chip.

The processing block P includes an IFU (Instruction Fetch Unit) 2, a PP (Preprocessor) 9, an AG (Address Generator) 3, and a PA (Processor Array) 4.

The memory block M includes a DRAM 1.

Other than the processing block P and the memory block M, the surface computer includes an IFDTC (Instruction Fetch and Data Transfer Controller) 5 and a BUS I/F (BUS Interface) 6.

This surface computer is implemented in one-chip LSI having the above-described functions incorporated therein.

This surface computer is connected to a main memory 7 and a central processing unit 8, both of which exist outside the surface computer. Although the external processing unit serves as the CPU in this embodiment, use of the surface computer is not necessarily limited to a local processing unit. The surface computer may serve as the central processing unit.

The IFDTC 5 is a control device for, under the control of the CPU 8, controlling fetching operations of surface computing instructions to be executed by the surface computer and transferring operations of surface region data to be processed by the surface computer. The operation of the IFDTC 5 allows the processing block P of the surface computer to serve as a coprocessor of the CPU 8, which reduces the load of the CPU 8.

The IFU 2 fetches a list of surface computing instructions executed on the surface computer from the main memory 7 under the control of the IFDTC 5.

The PP 9 computes the surface region corresponding to an operand of a surface computing instruction word and issues an instruction that computation data corresponding to this surface region is transferred from the DRAM 1 to primary and secondary buffers 10 and 11 which are included in the DRAM 1. Alternatively, a sense-amplifier or a cache memory can be used as a substitute for the buffer. As such, the primary buffer 10 and the secondary buffer 11 are also referred to herein as the primary sense-amplifier 10 and the secondary sense-amplifier 11. Furthermore, the PP 9 sets up the AG 3 in accordance with the operand. In addition, the PP 9 decodes general-purpose surface computing instructions which are called from the main memory 7 and which are fetched via the IFU 2.

The AG 3 generates an address for providing data fetched in the sense-amplifiers 10 and 11 to the PA 4, computes location dependence information within the surface regions, and outputs the resultant location dependence information to the PA 4. Computation of location dependence information means, for example, computation of an address for adjusting surface region data when the surface region sizes which determine the corresponding surface region data (objects to be computed) disagree and when an address of one surface region having data thereat corresponds to the address of the other surface region having no data thereat. Enlarging/reducing processing, interpolation processing such as bilinear interpolation processing or tri-linear interpolation processing, and the like for computation of location dependence information are described below.

Since the surface computer handles the surface region data, the structures of the operands of instruction words which specify the surface region data are different from those of conventional computers. Details of these operands are also described below.

The PA 4 computes the surface region data. In order to achieve high-speed computation, the PA 4 is constructed as a processor array including, for example, 16 unit computers 4a. However, the number of the unit computers 4a of the PA 4 is not necessarily limited to 16. Moreover, in order to achieve much faster computation, the PA 4 uses architecture such as superscalar architecture or super pipeline architecture. Superscalar and super pipeline architectures are also described below.

The PA 4 processes the computation surface region data in each operand supplied from the sense-amplifiers 10 and 11 based on an address code generated by the AG 3 in accordance with an operation code.

In addition, the PA 4 includes an MEMIF (memory interface) 12 for communicating with the memory block M. The MEMIF 12 communicates data with an external memory such as the main memory 7 or it operates the primary sense-amplifier 10 which performs writing processing such as destination operand region processing in which read-modify-write is performed.

Typically, the memory block M includes the DRAM 1. The DRAM 1 is an internal memory which serves as a work area for the surface computer in contrast with the main memory 7, which is outside of the surface computer. The storage capacity of the DRAM 1 is, for example, 32 Mbits.

The DRAM 1 includes the primary sense-amplifier 10 (or a buffer I) which serves as cache memory for transferring data between the MEMIF 12 and the DRAM 1 and the secondary sense-amplifier 12 (or a buffer II) which serves as cache memory for transferring data between the PA 4 and the DRAM 1.

The BUS I/F 6 outputs a list of general-purpose surface computing instructions stored in the main memory 7 to the IFU 2 and outputs the surface region data to the MEMIF 12.

As described above, the processing block P and the memory block M are interconnected with the data bus having a large data bus width. Specifically, data is transmitted from the MEMIF 12 of the PA 4 to the primary sense-amplifier 10 via an internal data bus for writing 13 having 1024 bits of bus width while data is transmitted from the primary sense-amplifier 10 of the DRAM 10 to the MEMIF 12 of the PA 4 via an internal data bus for reading 14 having 1024 bits of bus width. The data bus 14 is used primarily for surface region data transfer.

Furthermore, when the PA 4 includes, for example, 16 unit computers each having 32 bit data bus, the secondary sense-amplifier 11 of the DRAM 1 and the PA 4 are interconnected via a data bus 15 having 512 bit data bus width (=16×32 bits). The data bus 15 is used for reading operand information and the like which specify the surface region data.

The PA 4 and the DRAM 1 are directly interconnected using these three data buses 13, 14, and 15 having a total of as large as 2048 bit data bus width. This prevents data transfer between the memory block M and the processing block P from being the performance bottleneck.

Transfer of surface region data including quantities of data is realized by taking advantage of this feature.

2048 bit data bus width is only an example and the present invention is not limited to the size of the data bus width.

The CPU 8 (outside the surface computer) outputs instructions to the IFDTC 5 and outputs a list of general-purpose surface computing instructions (corresponding to a program) and surface region data via the BUS I/F 6 to the IFU 2 and the MEMIF 12.

The list of general-purpose surface computing instructions and the surface region data which are used in this surface computer are pre-stored in the main memory 7.

(Operations of Each Component of Surface Computer)

Figure 2:
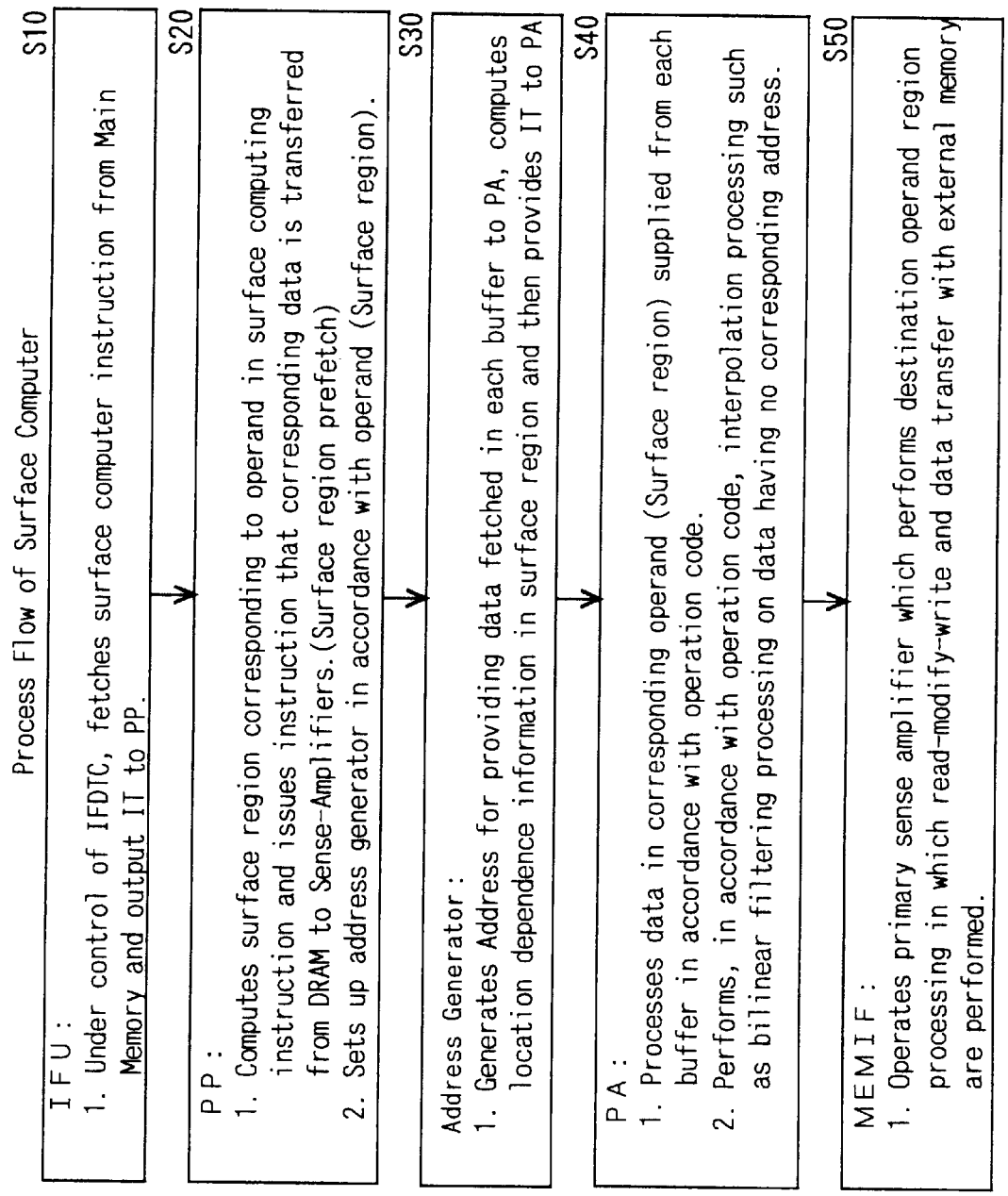
FIG. 2 is a flowchart illustrating operations of the surface computer shown in FIG. 1.

FIG. 2 shows a flowchart illustrating each component of the surface computer having the above-described construction.

With reference to FIG. 1, the CPU 8 controls the overall operations of the IFDTC 5.

At step S10, under the control of the IFDTC 5, the IFU 2 fetches the surface computing instruction output from the main memory 7 via the BUS I/F 6 and transfers the instruction to the PP 9.

At step S20, when the PP 9 receives the surface computing instruction, the surface region corresponding to an operand in an instruction word concerning this surface computing instruction is preprocessed (computed). Subsequently, the PP 9 outputs an instruction so that the surface region data specified based on the resultant computation is transferred from the DRAM 1 to the primary sense-amplifier 10 and/or the secondary sense-amplifier 11. That is, the computation surface region data is prefetched in the primary sense-amplifier 10 and the secondary sense-amplifier 11. In addition, the PP 9 sets up for the AG 3 (a subsequent stage of the PP 9) in accordance with surface region information in the operand of the surface computing instruction.

At step S30, the AG 3 generates an address obtained by performing address computation for providing, to the PA 4, the surface region data fetched in the primary sense-amplifier 10 and/or the secondary sense-amplifier 11. In addition, location dependence information in the surface region is computed. Subsequently, the AG 3 computes the address data and the location dependence information, and supplies the resultant data to the PA 4. This location dependence information is, for example, the address of the surface region data and, as described below, it contains information concerning whether an address of surface region data has a counterpart in the other surface region data.

At step S40, in accordance with the operation codes of the surface computing instruction, the PA (processor array) 4 processes computation surface region data in operands supplied from the primary sense-amplifier 10 and the secondary sense-amplifier 11 based on address data generated from the AG 3. When data has no counterpart (which means that the data has no corresponding address in the other surface region) due to difference of operand information specifying surface region data, the adjacent data output from the sense-amplifiers 10 and 11 (buffers) are processed in accordance with the operation code by means of interpolation processing such as bilinear interpolation processing or tri-linear interpolation processing so that data is generated having the correspondent in the other surface region.

At step S50, the MEMIF 12 exchanges data with the main memory 7 via the BUS I/F 6. In addition, the MEMIF 12 operates the primary sense-amplifier which writes data to the DRAM 1, whereby, for example, destination operand region processing and the like for executing read-modify-write operation (executing a reading operation and then a writing operation in one cycle) are performed.

Address Generation

Address generation step (step S30) is further described. When the PA 4 processes the surface region data in accordance with the operation code of surface computing instruction, there is sometimes no correspondence between both of surface region data due to the difference of operand information specifying each surface region data.

For example, no correspondence occurs when a pair of computation surface region data does not match, which means that the sizes of the surface region data are different. In this case, for example, by appropriately enlarging or reducing the surface region specified by the source operand so that the surface region specified by the source operand corresponds to the surface region specified by the destination operand, computation of both surface region data can be performed. This enlarging/reducing processing is performed typical by means of copy processing or interpolation processing.

In this manner, when the data size of each surface region is determined by causing the surface region specified by the source operand to correspond to the surface region specified by the destination operand, for example, the size of the surface region data is enlarged or reduced, or the sizes of the surface region data are processed so as to match a predetermined scale ratio of the surface region data.

There is a case in which no correspondence occurs between the addresses of parts of or the entirety of computation data which constitute the corresponding surface regions. In this case, by performing interpolation processing on one of or both of the surface regions, data is generated at the corresponding address thereof.

Even between surface regions having no corresponding computation data due to differences in operand information, such interpolation processing enables computation data in one surface region to have the counterpart data at the correspondence address of the other surface region. Accordingly, processing can be performed between an arbitrary pair of surface region data. As interpolation processing, typically bilinear filtering, tri-linear filtering, or the like is performed using adjacent data included in the surface region data.

(Enlarging Processing of Surface Region)

Figure 3B:
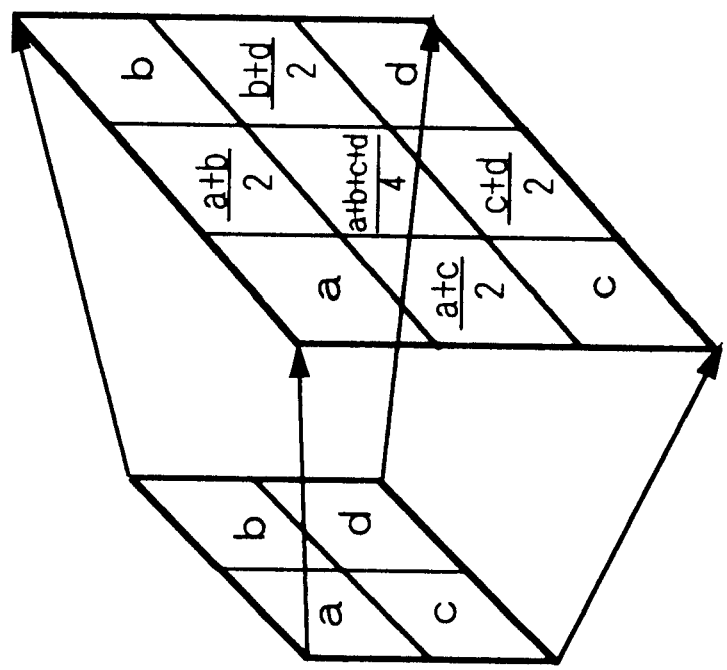
FIGS. 3A and 3B are diagrams illustrating enlarging processing of a surface region.
Figure 3A:
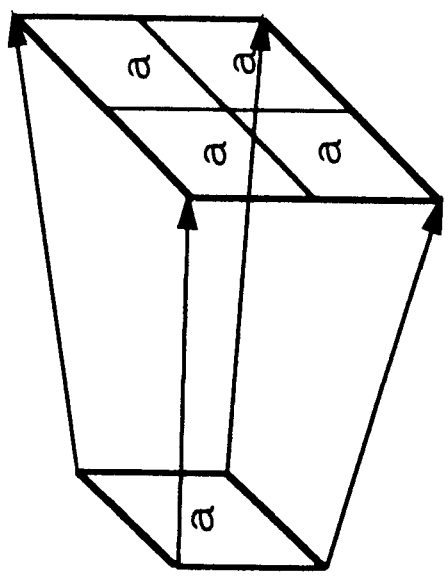

FIGS. 3A and 3B show enlarging processing of the surface region data. In an example shown in FIG. 3A, surface region data "a" is enlarged by duplicating the surface region enlargement data "a" and using a plurality thereof. In this case, a desired number of copying is performed on surface region data which has the same area as that of the surface region data "a" and which is not enlarged, whereby enlarging processing can be performed.

FIG. 3B shows another enlarging processing by means of interpolation processing. Four small surface region data "a", "b", "c", and "d" of the surface region data experiencing no enlargement is arranged as shown in FIG. 3B. When the surface region data is enlarged, each of the small surface region data is arranged to the corresponding corner. Adjacent small surface regions having areas of (a+b)/2, (a+c)/2, (b+d)/2, and (c+d)/2 are arranged, respectively, between "a" and "b", between "a" and "c", between "b" and "d", and between "c" and "d". A part enclosed by region data "a", "b", "c", and "d" has surface region data having an area of (a+b+c+d)/4. Thus, the surface region data consisting of small surface region data "a", "b", "c", and "d" are enlarged.

(Reducing Processing of Surface Region)

Figure 4B:
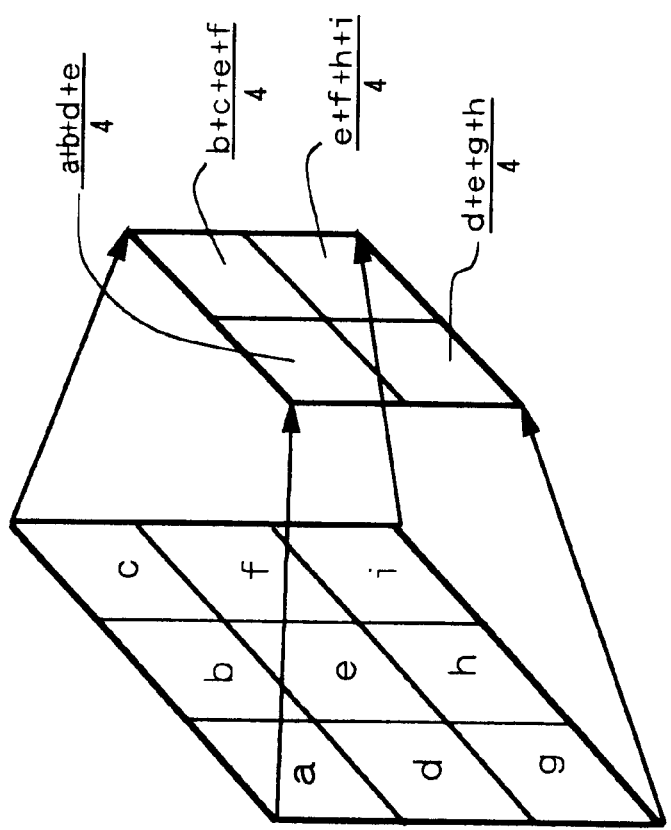
FIGS. 4A and 4B are diagrams illustrating reducing processing of the surface region.
Figure 4A:
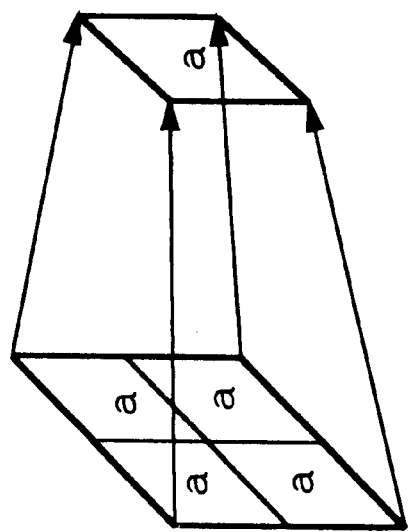

FIGS. 4A and 4B show reducing processing. Reducing processing is performed in the reverse direction of enlarging processing shown in FIG. 3A or 3B. In FIG. 4A, reducing is performed in the reverse direction of enlarging processing by means of copying shown in FIG. 3A. In FIG. 4B, reducing is performed in the reverse direction of enlarging processing by means of interpolation shown in FIG. 3B.

(Bilinear Processing)

Figure 5A:
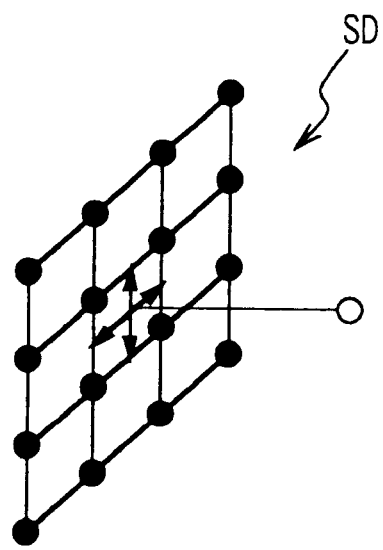
FIGS. 5A and 5B are diagrams illustrating inner interpolation processing.

FIG. 5A shows a diagram illustrating an example in which data is generated by means of bilinear interpolation as one example of interpolation processing. In one computation surface region data SD, the address represented by "O" in FIG. 5A has data stored thereat while, in the other computation surface region data SD, the address represented by "O" has no data stored thereat as shown in FIG. 5A. In this case, data is generated by means of inner interpolation processing using four proximal data of the address which is represented by "O" and which has no data thereat. That is, linear interpolation is performed in the oblique direction of the upper-right (for example, in the direction of the x-axis) (observed from the figure) and linear interpolation is vertically performed (for example, in the direction of the y-axis). Thus, such an interpolation method is called a bilinear interpolation method.

Even though surface region data SD discretely exists, for example, the surface region data SD exists only at addresses corresponding to intersections of positive grids as shown in FIG. 5A, a group of solid surface region data constituting this surface region can be obtained by means of bilinear processing.

(Tri-linear Processing)

Figure 5B:
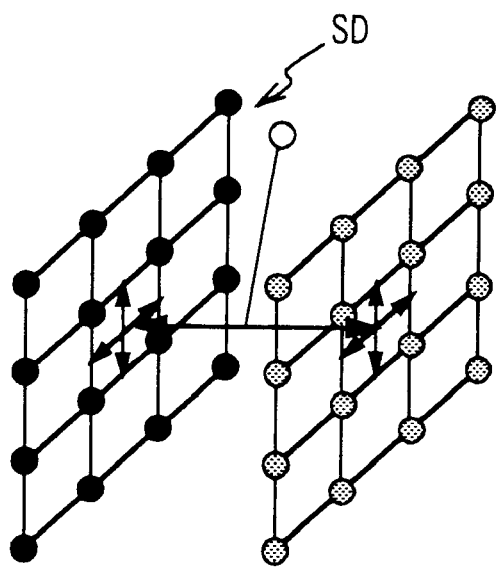

FIG. 5B shows a diagram illustrating an example in which data is generated by means of tri-linear interpolation. One computation surface region data SD is assumed to have no data at the corresponding address of the other surface region. In this case, as shown in FIG. 5B, surface region data is generated by means of interpolation processing using two surface region data SD which are in proximity to both sides of the corresponding address of the other surface region. That is, data is generated by means of the bilinear interpolation method at the address corresponding to surface region data SD to the left of the surface address having no data thereat, observed in FIG. 5B. Likewise, data is generated by means of the bilinear interpolation method at the address corresponding to surface region data SD to the right of the surface address, observed in the figure. By linearly interpolating these two generated data, the data having the address which is included in the other surface region and which is represented by "O" is obtained. Such an interpolation method is called a tri-linear interpolation method.

Even though a plurality of surface region data SD discretely exists, a plurality of surface region data SD which constitutes a surface mutually solidly specified can be obtained, for example, by means of a tri-linear method. That is, an arbitrary three-dimensional region can be established as an object to be computed for physical computation and the like.

(Point Sampling)

A point sampling is a method in which data is selected, based on a predetermined regularity, from among surface region data SD. The point sampling is used when the after-mentioned matrix computation is performed.

(Mask Processing)

Mask processing is a method in which data is discarded, based on a predetermined regularity, from among surface region data SD.

(Pattern Matching)

Figure 6:
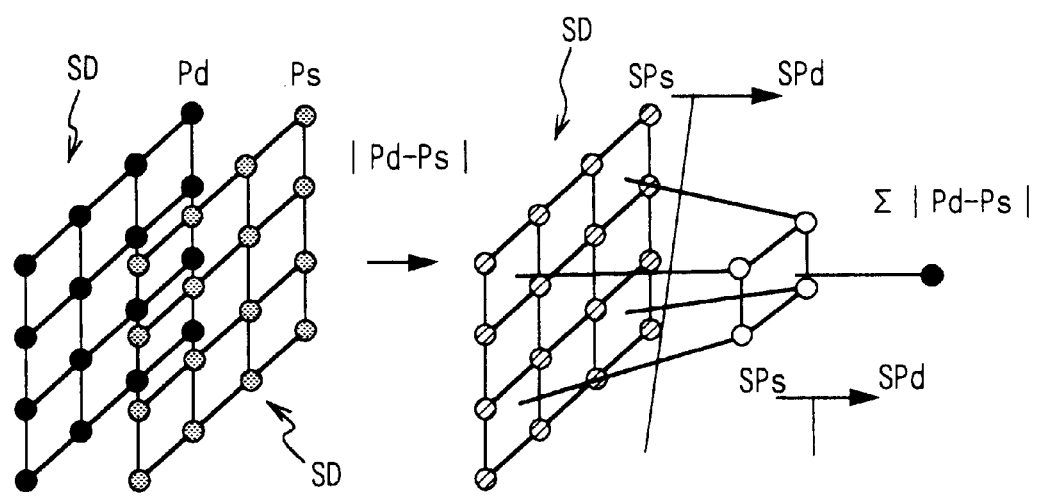
FIG. 6 is a diagram illustrating pattern matching processing.

FIG. 6 shows pattern matching processing. Pattern matching finds the distance between patterns. Pattern matching is performed using bilinear interpolation or tri-linear interpolation. In this processing, the difference (SPd=SPd−SPs) between the patterns is computed by surface computing processing and then the absolute value of the resultant difference (SPd=|SPd−SPs|) or the square of the resultant difference (SPd=(SPd−SPs)*(SPd−SPs)) is computed. Reduction-transfer is performed by means of the bilinear interpolation to a destination surface having a half of the length of the source surface and the total of the resultant differences is obtained. The reduction-transfer is recursively performed until a scalar value is obtained, whereby a final scalar value is obtained.

Programs executed on the surface computer appropriately selects from among the above-described enlarging processing, reducing processing, bilinear processing, tri-linear processing, point sampling processing, mask processing, pattern matching processing, and the like.

Features of Surface Computer and Comparison between SISD-type and SIMD-type Computer and Surface Computer Features of the surface computer are described compared with conventional SISD (Single Instruction Single Data stream) method and SIMD (Single Instruction Multi Data stream) method.

Figure 7C:
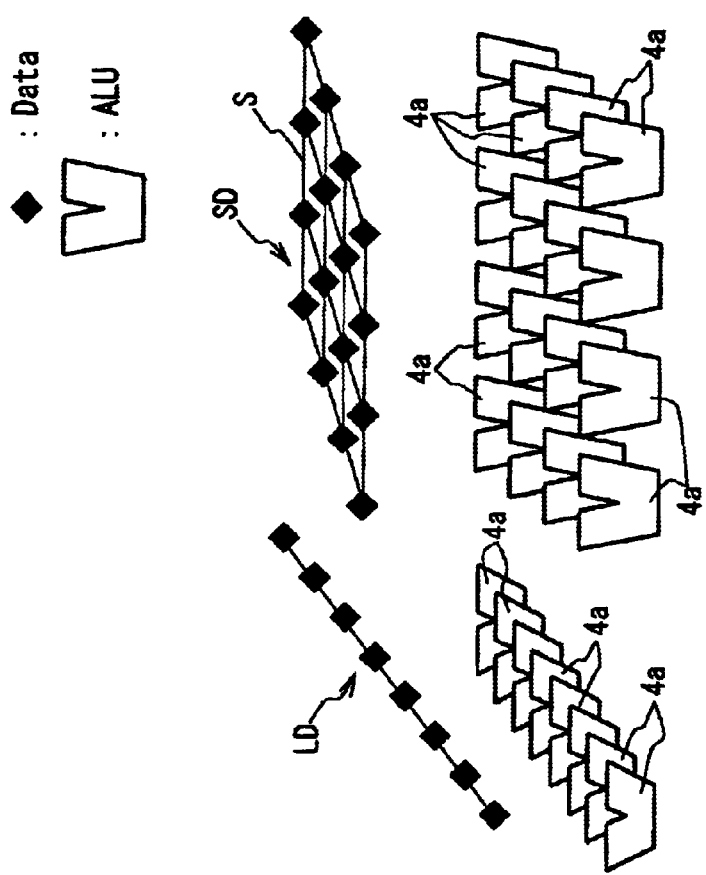
FIGS. 7A, 7B, and 7C are diagrams illustrating difference between conventional SISD-type and SIMD-type computers and the surface computer.
Figure 7B:
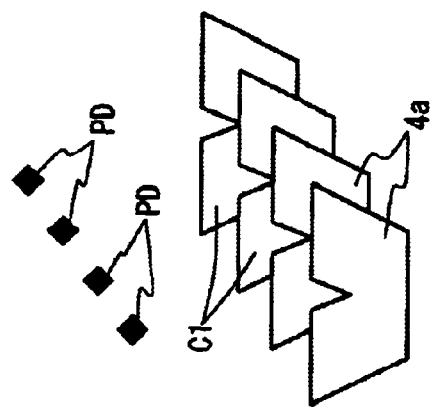
Figure 7A:
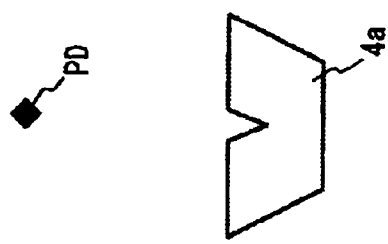

FIGS. 7A to 7C illustrate an SISD-type computer, an SIMD-type computer, and the surface computer from the viewpoint of an instruction stream and hardware mechanism.

In the SISD-type computer shown in FIG. 7A, the unit computer 4a sequentially performs computation using single data (hereinafter referred to as point data) PD in accordance with a single instruction. Therefore, when large-scale computation is performed, a great amount of time is required, which makes the SISD method inappropriate for this type of use.

In the SIMD-type computer shown in FIG. 7B, a plurality of unit computers 4a concurrently performs computation in accordance with a single instruction. Since the SIMD-type computer includes a plurality of unit computers, there is concurrence in an overall instruction executing sequence. To ensure the concurrence of the instruction executing sequence, the number of the unit computers 4a is determined based on the number of parallel instruction executing sequences.

When large-scale computation is performed, the SIMD-type computer performs much faster than the SISD-type computer. However, as described above, there are demands for a type of physical computation and the like requiring a large quantities of data which cannot be handled even by the SIMD-type computer.

The surface computer regards data as a surface. That is, the surface computer specifies the data group based on a surface region and processes it. Data which belongs to one data group is transferred and is processed as surface region data SD once (or several times) whereby the number of repetitions of data transfer and computation is greatly decreased. Consequently, the surface computer achieves high performance in computation.

From the viewpoint of a concept in which a group of data is treated at a time, as shown in FIG. 7C, the data may be line data LD which is specified by a line. Accordingly, the concept of the surface computer includes a line computer.

Features of the surface computer are that data itself concurrently exist. The number of unit computers 4a is independent of the number of surface data SD, the number of instruction executing sequences, and the like. Since the surface computer computes the entirety of a surface region including a plurality of computation data, the computation data is concurrence. The computing method of the surface region data and the number of unit computers 4a required for the computing method are determined by the computer program and they are independent of the surface region data SD. The surface computer may sequentially perform computation itself.

However, when large quantities of data are processed at high speed, it is obvious that acceleration in computation can be achieved by providing a plurality of unit computers. Therefore, in the present invention, 16 unit computers are provided in the PA 4. As described below, when needed, superscalar or super pipeline architecture can be used as the architecture of the PA 4, whereby more acceleration in computation can be realized.

The surface computer differs from the other two methods in that:

(1) the SIMD-type computer has concurrence in the instruction executing sequence while the surface computer has concurrence in data;

(2) the SISD-type and SIMD-type computers handle the point data PD while the surface computer handles the surface region data SD;

(3) since the surface computer handles the surface region data SD, it has a different structure in computer language from those of the SISD-type computer and the SIMD-type computer, both of which handle the point data PD, that is, there is a difference, in the form of an operand constituting an instruction word, between the surface computer and the SISD-type and SIMD-type computers;

(4) the SIMD-type computer handles only discrete point data PD while the surface computer handles the entire data of a solid surface region using the above-described inner interpolation processing or the like (furthermore, the surface computer can handle an arbitrary surface region data in three dimensions); and (5) the number of unit computers 4a of the SIMD-type computer is dependent on the number of parallel instruction executing sequences while the number of unit computers 4a of the surface computer is independent.

Before describing these differences, processing of the surface computer is described compared with the SISD-type computer and the SIMD-type computer using an example of typical matrix computation in which large quantities of data is processed.

(Difference Between SISD-type and SIMD-type Computers and Surface Computer with Respect to Matrix Computation)

Figure 8:
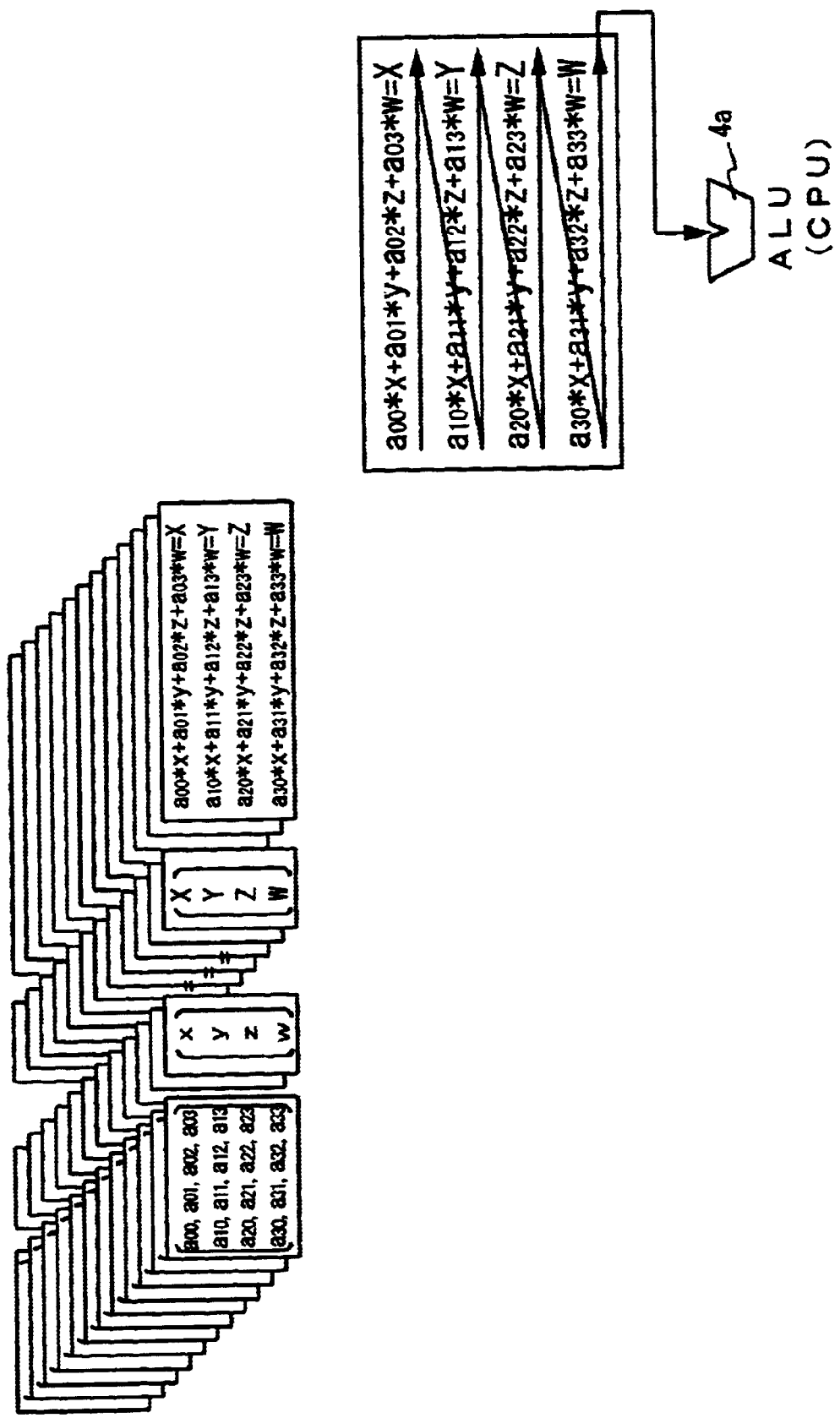
FIG. 8 is a diagram illustrating computing processing when matrix computation is performed using the SISD-type computer.
Figure 9:
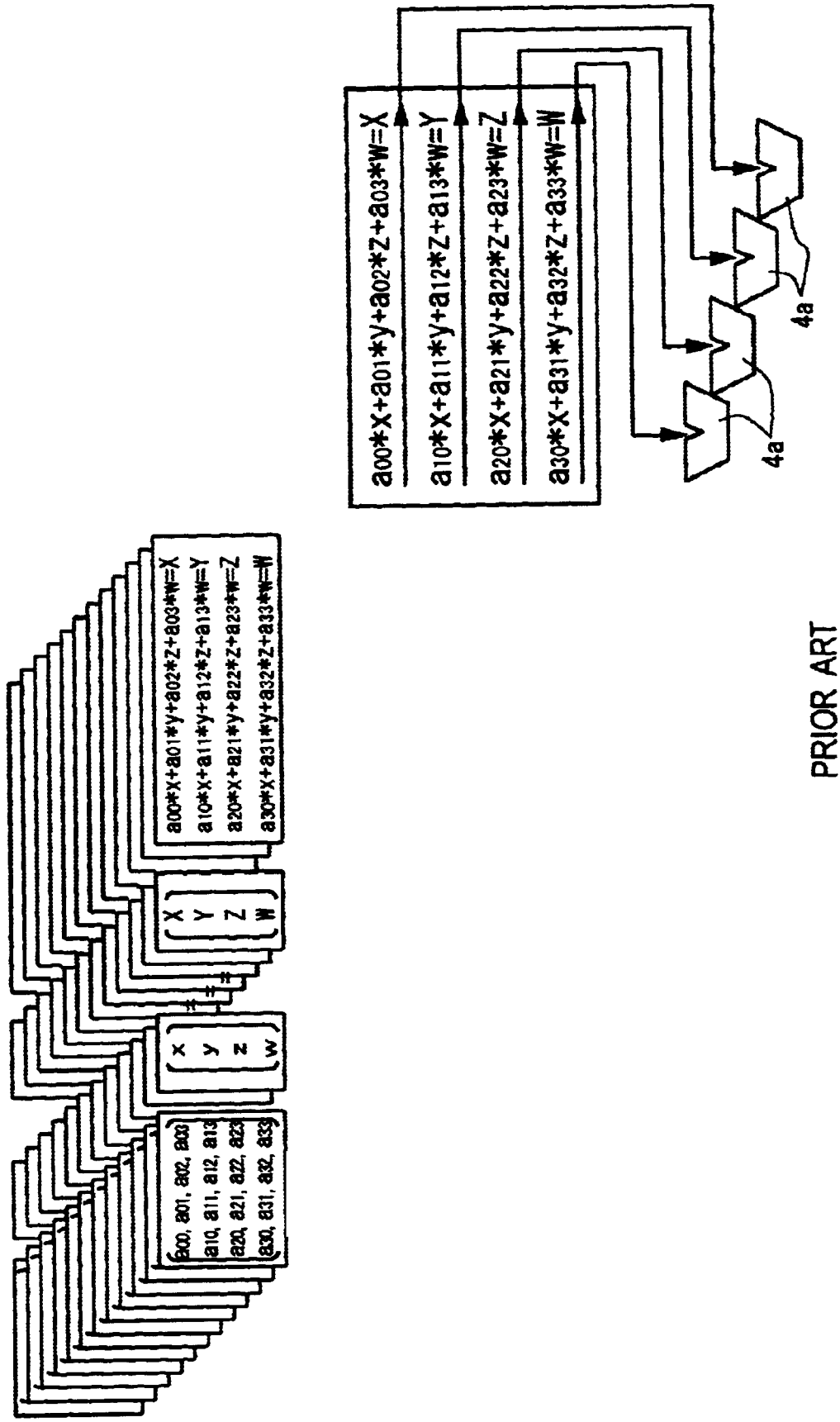
FIG. 9 is a diagram illustrating computing processing when matrix computation is performed using the SIMD-type computer.
Figure 10:
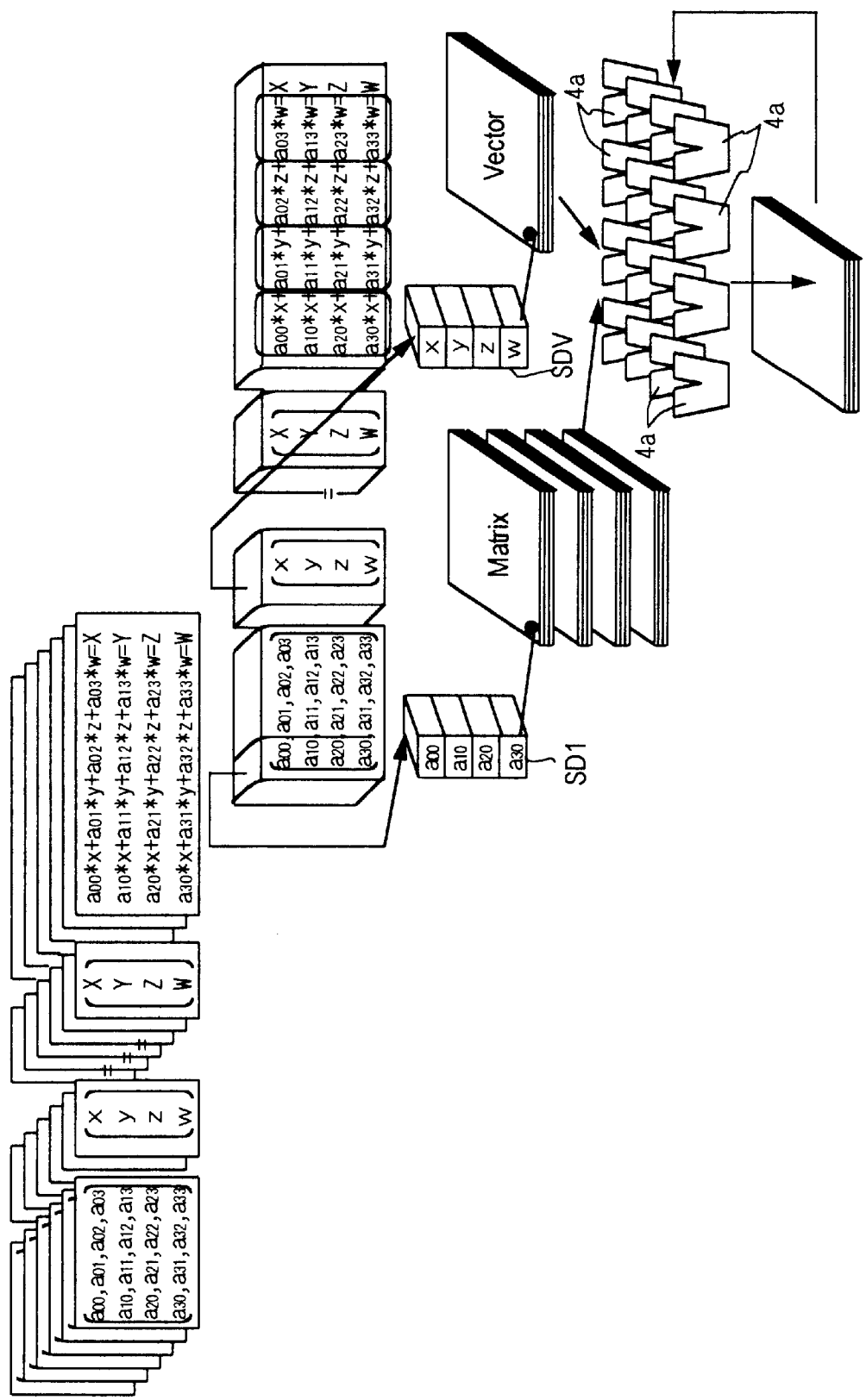
FIG. 10 is a diagram illustrating computing processing when matrix computation is performed using the surface computer.

FIGS. 8 to 10 illustrate processing of large quantities of matrix computation using the SISD-type computer, the SIMD-type computer, and the surface computer, respectively. Matrix computation described here is used for, for example, coordinate transformation with respect to three-dimensional image data. In this case, a column vector (x, y, z, w) constituting the image data is coordinate-transformed into a point (X, Y, Z, W) using each of coefficient matrices shown in FIGS. 8 to 10, respectively.

When such matrix computation is performed using the SISD method illustrated in FIG. 7A, the computations in a box in FIG. 8 are sequentially performed.

$$a_{00}{}^*x+a_{01}{}^*y+a_{02}{}^*z+a_{03}{}^*w=X$$

In this case, for example, computation is sequentially performed from the first term of the left-hand side. In the same manner, the following computations are sequentially performed.

$$a_{10}{}^*x+a_{11}{}^*y+a_{12}{}^*z+a_{13}{}^*w=Y$$

$$a_{20}{}^*x+a_{21}{}^*y+a_{22}{}^*z+a_{23}{}^*w=Z \text{ and}$$

$$a_{30}{}^*x+a_{31}{}^*y+a_{32}{}^*z+a_{33}{}^*w=W$$

Since this sequence is repeated a number of times according to the size of data, it takes substantial amounts of time to complete the above computation. In this example, elements of the matrix $a_{10}$ to $a_{33}$ are point data PD, and, in this SISD method, $a_{10}{}^*x$, etc., are sequentially computed.

Next, when, as shown in FIG. 9, the same matrix computation is performed using the SIMD-type computer illustrated in FIG. 7B, four unit computers 4a substantially concurrently compute the corresponding four expressions shown in a box in FIG. 9 in accordance with a single instruction.

A first unit computer 4a computes the products of elements $a_{00}$, $a_{10}$, $a_{20}$, and $a_{30}$ of the matrix and elements x, y, z, and w of a column vector, respectively, and then computes the sum of the resultant products.

$$a_{00}{}^*x+a_{01}{}^*y+a_{02}{}^*z+a_{03}{}^*w=X$$

A second unit computer 4a computes substantially concurrently.

$$a_{10}{}^*x+a_{11}{}^*y+a_{12}{}^*z+a_{13}{}^*w=Y$$

A third unit computer 4a computes substantially concurrently.

$$a_{20}{}^*x+a_{21}{}^*y+a_{22}{}^*z+a_{23}{}^*w=Z \text{ and}$$

A fourth unit computer 4a computes substantially concurrently.

$$a_{30}{}^*x+a_{31}{}^*y+a_{32}{}^*z+a_{33}{}^*w=W$$

Since these computations are performed substantially concurrently, the SIMD-type computer can process substantially faster than the SISD-type computer.

FIG. 10 illustrates a case in which the same matrix computation is performed using the surface computer according to the present invention. The columns of the four-dimension square matrix on the left-hand side of the expression shown in the upper part of FIG. 10 are treated as surface region data SD1, SD2, SD3, and SD4, respectively. The column vector on the right-hand side is treated as surface region data SDv. Those surface region data are input to the PA4 in which necessary multiplications and additions are applied to between each of the surface region data SD1, SD2, SD3, and SD4 and the surface region SDv.

When the size of the surface region specified by the operand in each surface region data does not match, the above-described enlarging/reducing processing and the like cause the size of each surface region to be matched. In this case, no inner interpolation processing, but instead point sampling processing or mask processing is performed on each element of the matrices, whereby surface computation is carried out while the value of the coefficient of each element is held.

When necessary computation is performed between each of the surface region data SD1, SD2, SD3, and SD4, and the surface region SDv, specifically, four sets of the surface region data SD1, SD2, SD3, and the SD4, which amounts to 16 surface regions, are provided along with four surface region data SDv. Each product obtained by multiplying the surface region data SD1 and SDv, i.e., $a_{00}{}^*x, a_{10}{}^*y, a_{20}{}^*z$, and $a_{30}{}^*w$; each product obtained by multiplying the surface region data SD2 and SDv, i.e., $a_{01}{}^*x, a_{11}{}^*y, a_{21}{}^*z$, and $a_{31}{}^*w$; each product obtained by multiplying the surface region data SD3 and SDv, i.e., $a_{02}{}^*x, a_{12}{}^*y, a_{22}{}^*z$, and $a_{32}{}^*w$; and each product obtained by multiplying the surface region data SD4 and SDv, i.e., $a_{03}{}^* x, a_{13}{}^*y, a_{23}{}^*z$, and $a_{33}{}^*w$ are computed at the same time. Using the results of the above computations, the following computations are performed.

$$a_{00}{}^*x+a_{01}{}^*y+a_{02}{}^*z+a_{03}{}^*w=X$$

$$a_{10}{}^*x+a_{11}{}^*y+a_{12}{}^*z+a_{13}{}^*w=Y$$

$$a_{20}{}^*x+a_{21}{}^*y+a_{22}{}^*z+a_{23}{}^*w=Z \text{ and}$$

$$a_{30}{}^*x+a_{31}{}^*y+a_{32}{}^*z+a_{33}{}^*w=W$$

Since the surface computer according to the present invention transfers and computes such surface region data once or several times, large-scale matrix computation and the like can be performed at high speed.

Points of Difference Between Surface Computer and the Other Two Computers

The above-mentioned five differences are described.
(First Point of Difference)

First, the surface computer differs from the SIMD-type computer in that data handled by the surface computer are concurrent while instruction-executing sequences handled by the SIMD-type computer are concurrent.

However, the surface computer does not deny the concept of the SIMD method. The surface computer can be constructed using the concept of the SIMD method. For example, by providing a plurality of surface computers, the instruction executing sequence is caused to have concurrence as the overall system, whereby the surface computer can be constructed using the SIMD method.

(Second Point of Difference)

Secondly, the surface computer differs from the SISD-type and SIMD-type computers in that the surface computer handles the surface region data SD while the other two computers handle the point data PD.

The surface computer is constructed so as to be capable of transferring and computing two-dimensional surface region data SD (including line data LD) in units of regions.

Figure 11:
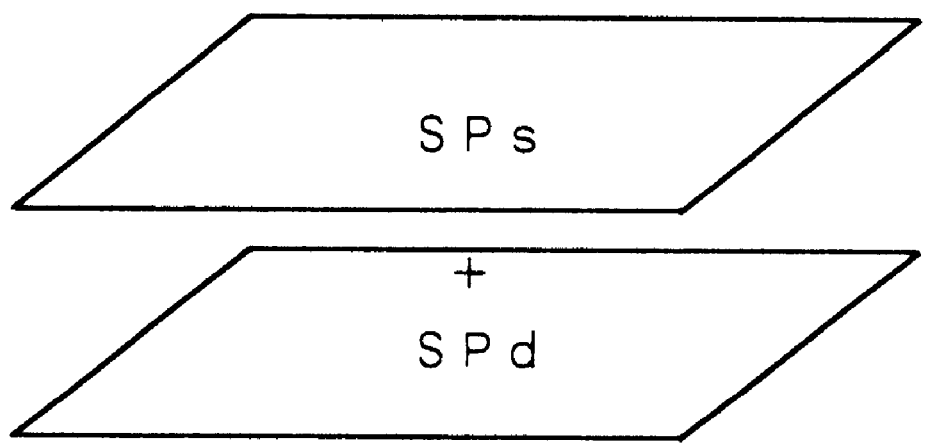
FIG. 11 is an illustration of computation processing in the surface computer.

For example, when surface region data SPs and SPd are added as shown in FIG. 11, each of the surface region data SPs and SPd is transferred and computed at a time. Accordingly, the surface computer can handle data faster than the SIMD-type computer which repeats sequential transferring and computation of point data PD. That is, since this surface computer transfers and computes computation data in the region specified by the operand in units of surface regions, the number of repetition times of transfer and computation is greatly decreased. Therefore, high-speed computation can be realized.

(Alternatives of PA 4)

When high-speed computation is desired, in addition to acceleration in data transfer, acceleration in computation processing is also important. In order to accelerate processing speed, concurrent processing by the concurrent computer including 16 unit computers 4a shown in FIG. 1 is employed in the processor array according to the present invention. Other than the above concurrent computer, a high-speed processor having the construction, for example, shown in FIG. 12 can be employed. The concurrent processor in FIG. 12 employs the superscalar and super pipeline architectures.

The superscalar architecture is an architecture which accelerates the processing speed by improving the multiplicity in the space domain of the pipeline by causing a plurality of instruction fetch/decode mechanisms and ALUs to concurrently operate. The super pipeline architecture is a method which improves the multiplicity in the time domain by deepening the pipeline.

Figure 12:
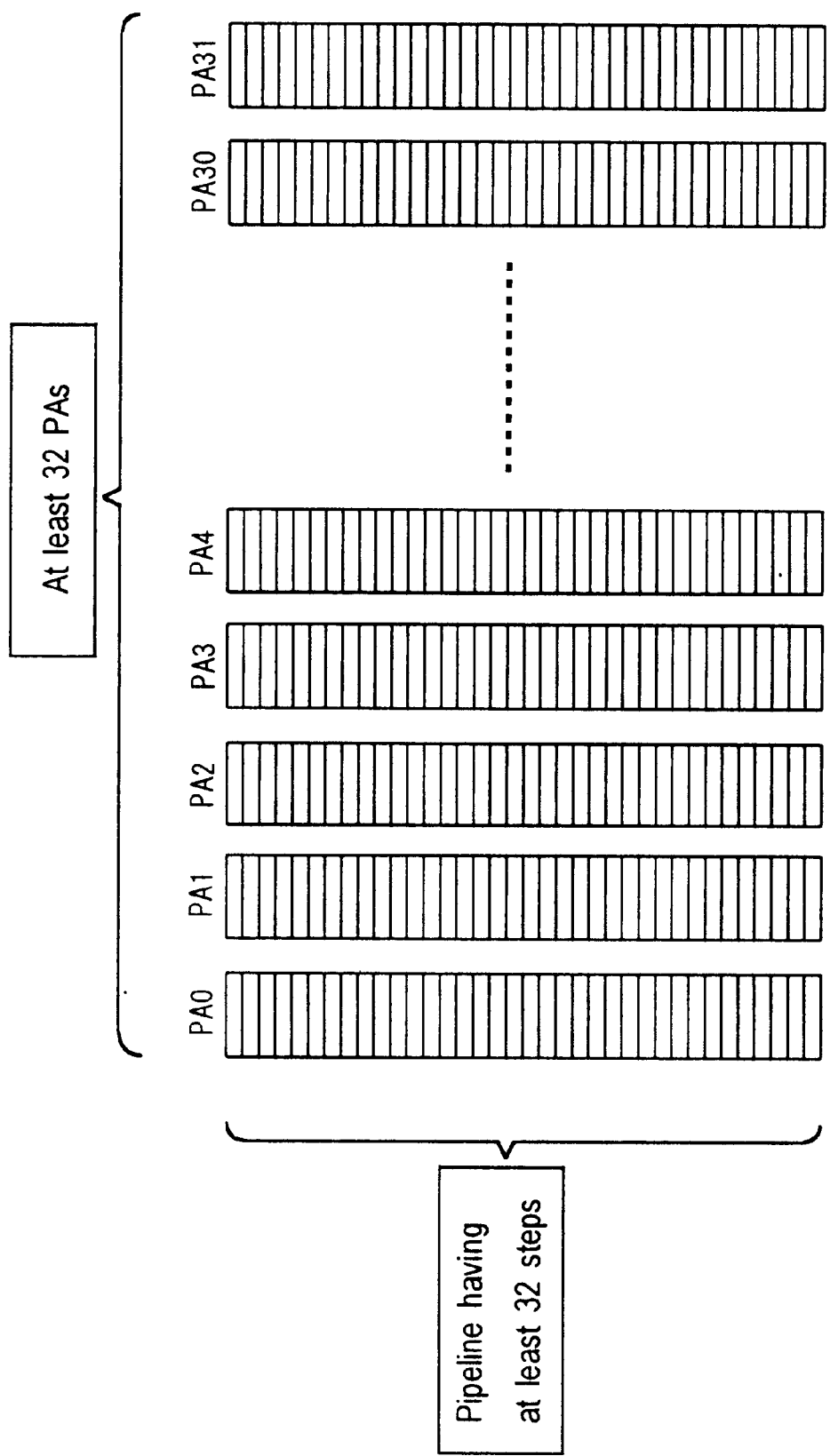
FIG. 12 is a block diagram showing another construction of the main part of the surface computer.

In this example, at least 32 PAs 4 are provided as shown in FIG. 12. Moreover, the pipeline having at least 32 steps is provided in one PA 4. Accordingly, in this example construction, at least 1024 instructions (=32 steps×32) can be concurrently executed in a single clock.

(Third Point of Difference)

Thirdly, since the surface computer handles the surface region data SD, it has a different structure in computer language from those of the SISD-type computer and the SIMD-type computer, both of which handle the point data PD. That is, there are differences in the form of an operand constituting an instruction word between the surface computer and the SISD-type and SIMD-type computers.

(Difference in Operand Structure)

The surface computer greatly differs from the conventional SISD-type and SIMD-type computers in that computation data in the surface region is specified and computed based on the surface region which is established as a unit. Accordingly, the surface computer has a different structure in the computer language from those of the other type computers.

Figure 13A:
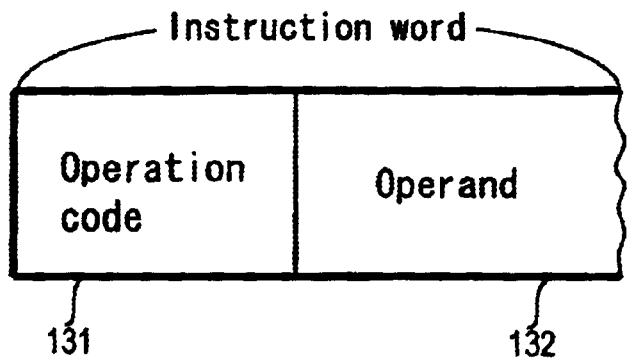
FIGS. 13A and 13B are diagrams showing instruction words.
Figure 13B:
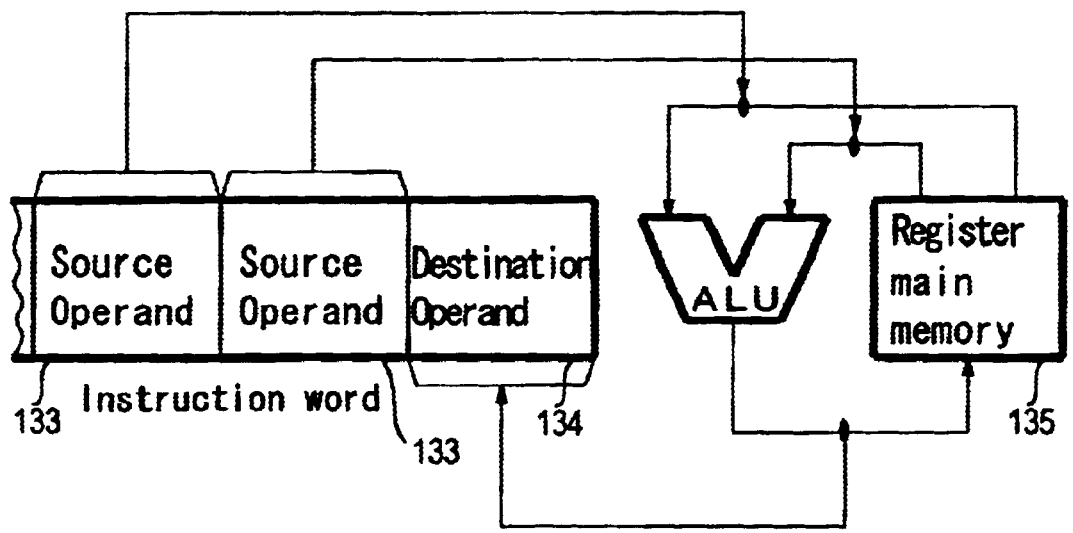

As shown in FIG. 13A, in the conventional two types of computers, the instruction word (a typical single instruction) including an operation code 131 and at least two operands 132. The operand 132 serves to index or specify the address of various computation data. As shown in FIG. 13B, the operand 132 includes a source operand 133 for specifying the source address of data and a destination operand 134 for specifying the destination address of the data.

In the two conventional computers, since data specified by each operand is individually a single data (a scalar value or a vector value, that is, point data), during computing, processing is repeated in which the single data (point data) is sequentially called and processed.

In the surface computer, the instruction word includes the operation code and two operands. The surface computer is the same as these two types of computers in that the operand includes the source operand and the destination operand. However, the operand of the surface computer represents a two-dimensional region, which means that the addressing mode represents a two-dimensional region. Accordingly, the surface computer differs from the conventional computers in that the surface computer specifies the surface region data while the conventional computers specify the point data.

The operand of the surface computer specifies the surface region performed by normally specifying, for example, four point data which enclose the surface region.

The data specified by the operand in the instruction word of the surface computer are sometimes seemingly one-dimensional. For example, a certain region can be specified using a pointer (point) and a line L in which the point is established as a base point of the line L and the length of the entire data is established as the length of the line L. This can allow operands of the surface computer to be represented by the point and the line L.

In addition, as described above, the surface computer includes the line computer. When the line computer is used, the operands which specify line data include, for example, two pointers.

Thus, since the operands of the surface computer according to the present invention are different from those in conventional computers, there are differences between the surface computer and the conventional computers in the structures of the computer language systems thereof, that is, the sets of the instruction words thereof.

The following representation examples can be denoted as example operands representing the region of the surface region data.

(1) square-point type (denoted by "SP"); SP(X1, Y1, X2, Y2)
(2) triangular type (denoted by "TR"); TR(X1, Y1, X2, Y2, X3, Y3)
(3) triangular mesh type (denoted by "TRM"); TRM(X1, Y1, X2, Y2 . . . ,Xn, Yn)
(4) line type (denoted by "LN"); LN(X1, Y1, X2, Y2)

X and Y represent coordinates (address).

The square point type SP (1) represents the-coordinates of a pair of vertices of a square surface region on a diagonal line thereof.

The triangular type TR (2) represents the coordinates of the vertices of a triangular region.

The triangular mesh type TRM represents a set of specific points (selected based on a predetermined rule) in the triangular region.

The line type LN (4) represents a line.

The surface region can take an arbitrary form other than a rectangle or a triangle. Furthermore, in the square point type SP, the rectangular region may be represented with the coordinates of one vertex and the length of a side or a diagonal line passing through this vertex.

(Relationship Between Operands Specifying Region and Concurrent Computation)

Figure 14:
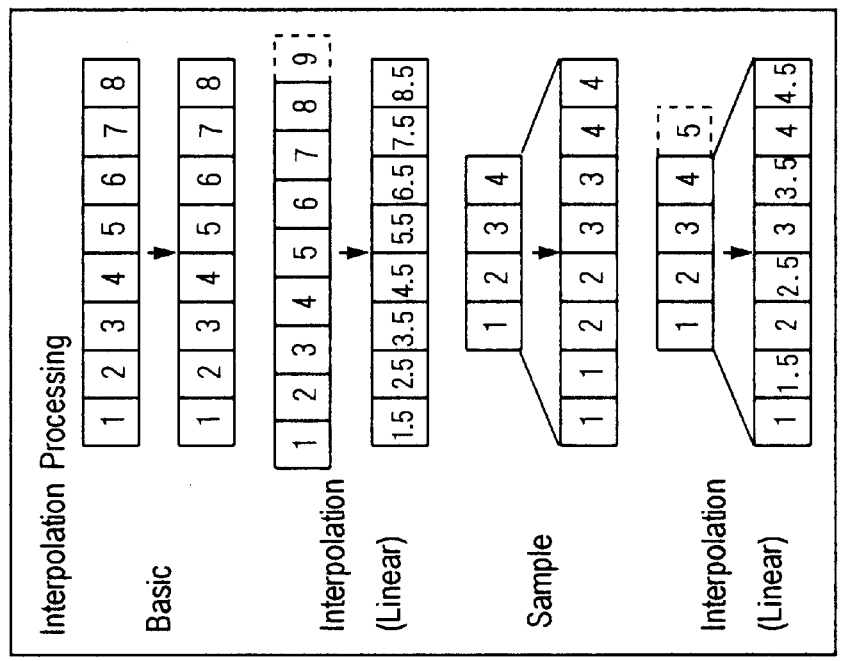
FIG. 14 is a diagram illustrating an operand example and an interpolating operation of the surface computer.
Figure 14:
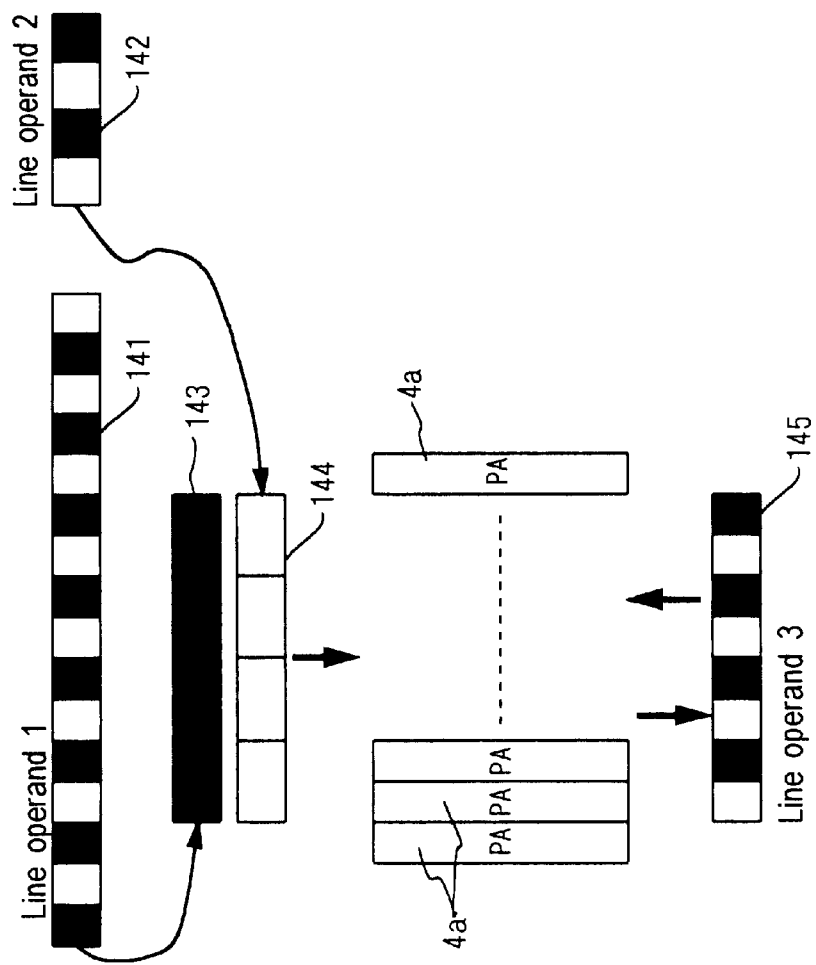

Relationship between the operands of the line computer and concurrent computation is described. FIG. 14 illustrates a case in which line regions having mutually different regions (the lengths in this case) are computed. A line region data 143 is obtained by reducing a region 141 specified by a line operand 1 while a line region data 144 is obtained by enlarging a region data 143 specified by a line operand 2, whereby the line region data 143 and 144 (lengths) are matched. The PA 4 performs surface (line) computing processing. After computation, the resultant data is stored in a line region 145 specified by a line operand 3.

When the sizes of the line regions are matched, in the same manner as in surface region computing, various methods exemplified in the right half of FIG. 14 such as copying, linear interpolation, sampling, enlarging processing, and the like are performed so that the size of the line region is appropriately changed.

(Concurrent Processing of PA and Many Operands)

Figure 15:
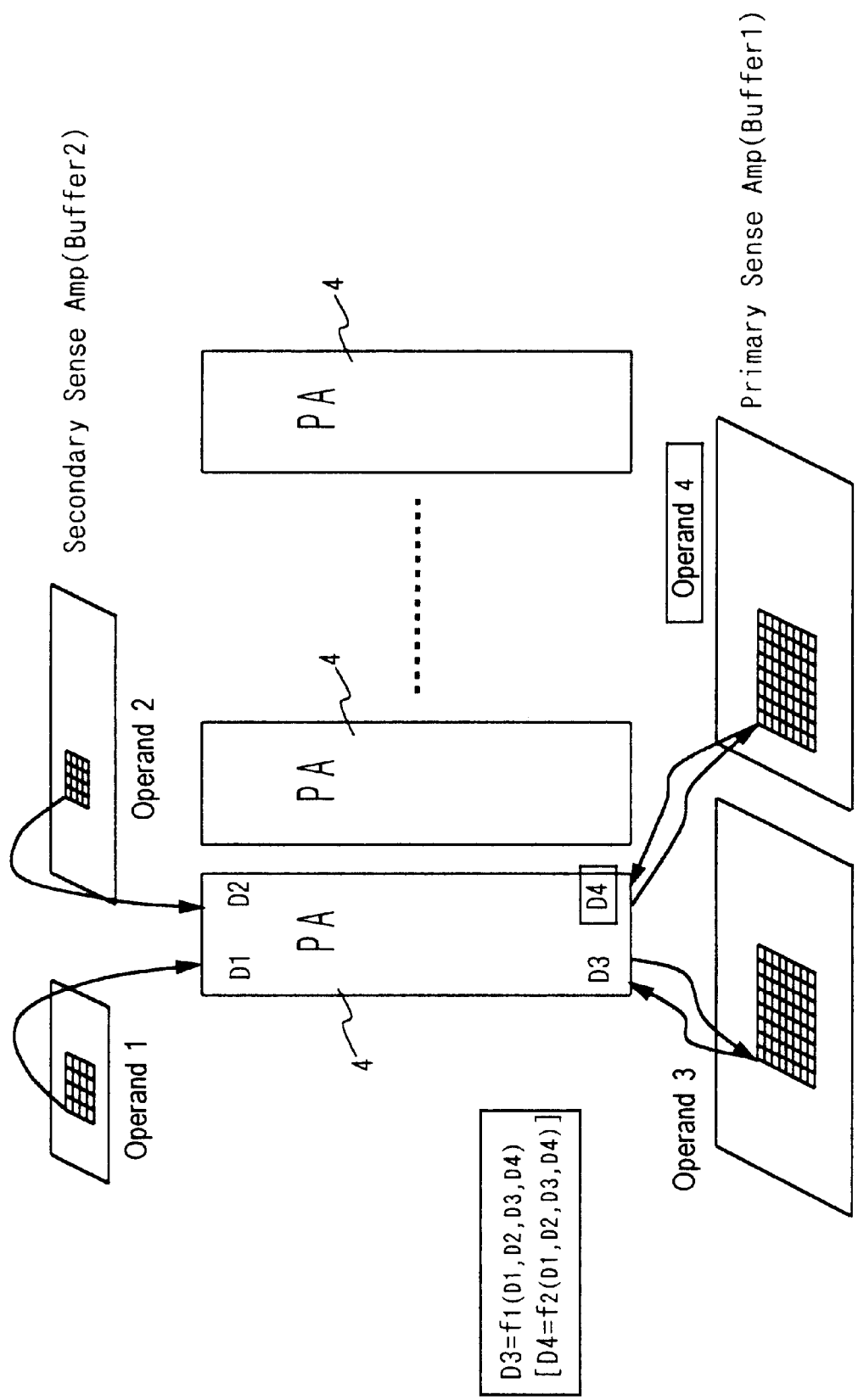
FIG. 15 is a diagram illustrating concurrent processing of a processor array.

FIG. 15 shows concurrent processing of the PA 4 and many operands. Computation data D3 and D4 stored in the primary sense-amplifier 10 and specified by the operands 3 and 4 are input to among a plurality of PAs 4 while computation data D1 and D2 stored in the secondary sense-amplifier 11 and specified by the operands 1 and 2 input to among a plurality of PAs 4. The resultant data obtained by performing a desired operation on these data are stored in the primary sense amplifier 10. For example, when D3=f1(D1, D2, D3, D4) is computed, the resultant data is stored in the operand 3. When D4=f2(D1, D2, D3, D4) is computed, the resultant data is stored in the operand 4.

The fourth point difference is that the surface computer can use the data of the entirety of the solid surface region by using the inner interpolation processing or the like while the SIMD-type computer can handle only discrete point data. This is already described along with enlarging/reducing processing of the surface region and the inner interpolation processing.

The fifth different point is that the number of unit computers 4a of the surface computer is independent while the number of unit computers 4a of the SIMD-type computer is dependent on the number of parallel instruction executing sequences. This is also already described when both methods are compared.

Typical Instruction Example of Surface Computer (Instruction and Data Flow)

Figure 16:
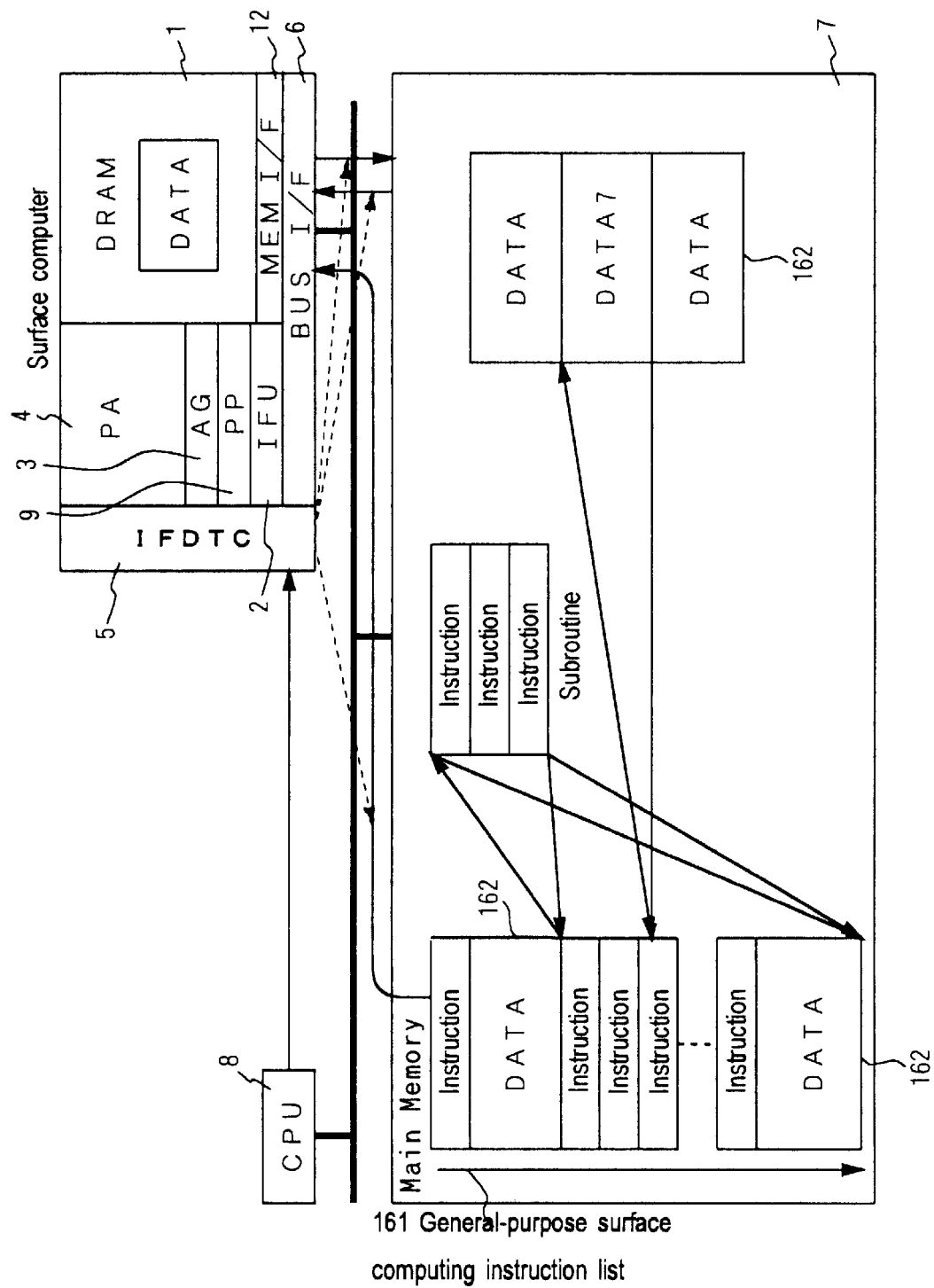
FIG. 16 is a diagram illustrating flow of an instruction and data in a construction in which the surface computer is used as a coprocessor.

Instruction execution (control) of the surface computer is described. FIG. 16 shows instruction and data flow of the example construction shown in FIG. 1 in which the surface computer according to the present invention functions as a coprocessor of the CPU 8.

This surface computer interconnects with the CPU 8 and the main memory 7 via the BUS I/F 6 and the data bus. A general-purpose surface computing instruction list 161 and computation surface region data 162 are stored in the main memory 7.

Under the control of the CPU 8, the IFDTC 5 controls the general-purpose surface computing instruction list 161 so as to be directly transferred to the IFU 2 via the BUS I/F 6 of the surface computer. Likewise, the IFDTC 5 controls the computation surface region data 162 so as to be directly transferred to the DRAM 2 via the BUS I/F 6. Thus, since the IFDTC 5 controls the instruction list 161 and the surface region data 162 to be directly transferred to the surface computer without aid from the CPU 8, the load of the CPU 8 is reduced. By having such a construction, not only two-operand or three-operand computation but also four-operand computation can be controlled.

(Condition Branch)

Condition branch, which is a typical instruction of the computer having the above construction, and an indirect operand are described.

Figure 17:
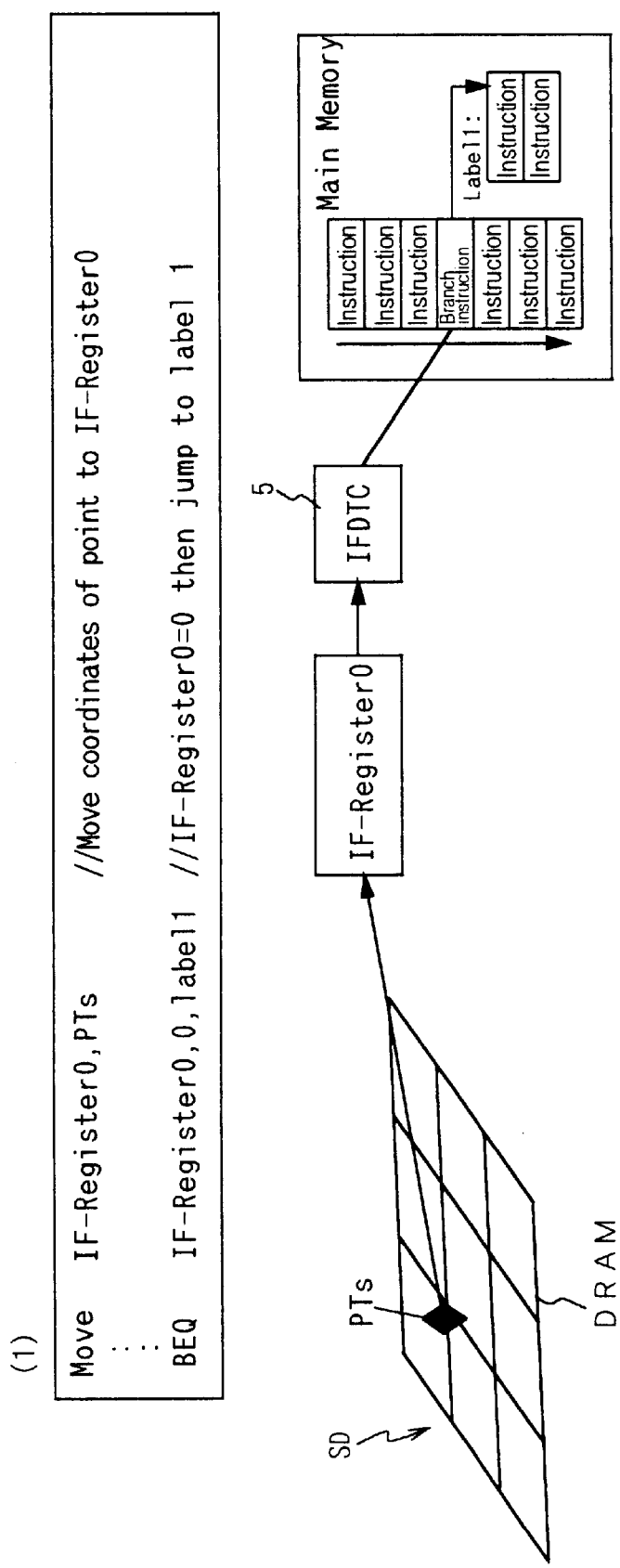
FIG. 17 is a diagram illustrating condition branch processing of the surface computer.

FIG. 17 illustrates a condition branch from among functions of this surface computer. Under the control of the IFDTC 5, the IFU 2 executes the condition-branch based on the value of the register. In the example shown in FIG. 17, when a Move instruction causing a point PTs of the surface region data 161 in the DRAM 1 to be moved to a register #0 in the IFDTC 5 is executed, if the value of the register #0 is equal to 0, branching to the Label 1 in the main memory 7 is executed. Thus, the surface computer according to the present invention can switch processing in accordance with the result of computation. That is, the surface computer according to the present invention has a function which enables the instruction fetch of the IFDTC 5 to condition branch in accordance with the value of the register.

This processing is performed in the direction of an arrow (1) in FIG. 1. Provision of the condition-branching processing facilitates the surface computer programming. In addition, this condition branch processing is a concurrent processing which takes over "jump" instruction in the conventional sequential processing.

(Indirect Operand)

Figure 18:
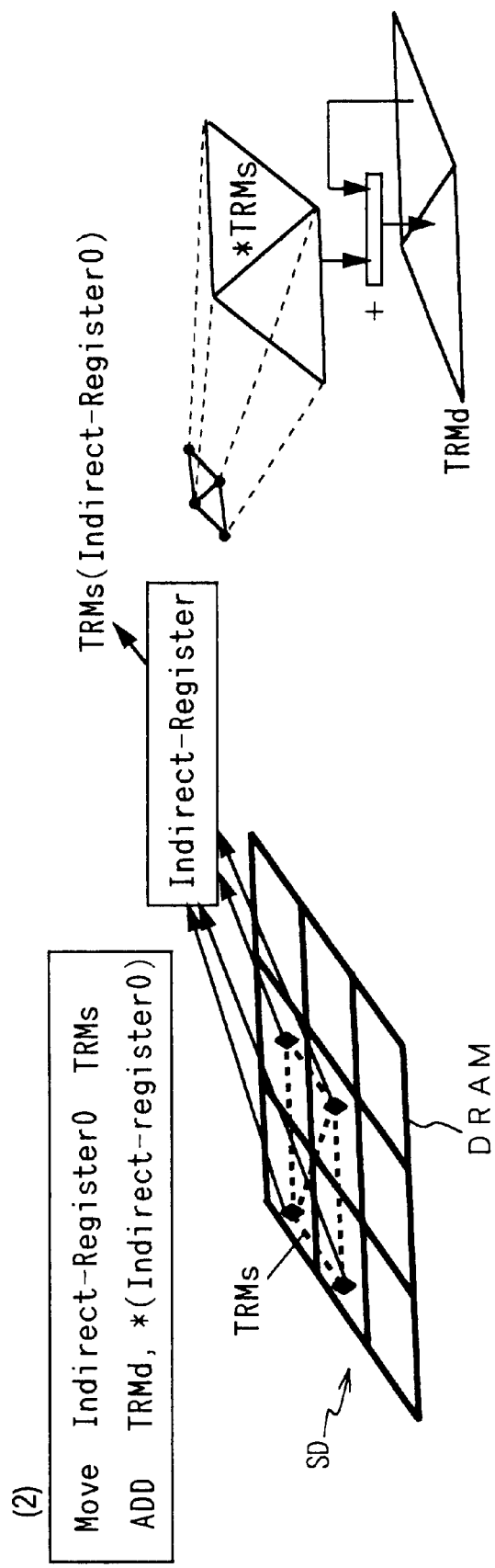
FIG. 18 is a diagram illustrating a direct operand of the surface computer.

FIG. 18 shows the indirect operand of this surface computer. The indirect operand serves to have the source operand read and establish the value of the source operand as an executing address for next access. In the indirect operand of the surface computer according to the present invention, the coordinates of the operand specifying the surface region data SD is represented as data in the surface region data SD. The operand region is obtained.

In FIG. 18, an indirect operand *TRMs specified by a source operand TRMs and a destination operand TRMd are added and then the resultant data is set to the TRMd. The PA4 and the PP 9 handle this indirect operand as shown in the direction of an arrow (2) in FIG. 1. In this surface computer, even though the quantity of data processed at a time is large, the indirect operand mechanism is effective, because the overhead of processing becomes less due to this mechanism.

In this embodiment, coordinate data is 32 bit based and may be treated as 32 bit (fixed point, floating point), 16 bit×2 (fixed point), 10 bit×3 (fixed point), or 8 bit×4 (fixed point) data. When the coordinates of the surface region operand is represented by the surface region data SD, two-dimensional coordinates are represented using 16 bit×2 (fixed point) data while three-dimensional coordinates for tri-linear interpolation are represented using 10 bit×3 (fixed point). When coordinates are represented in 32 bits, two operands are required for representing two-dimensional coordinates and three operands are required for representing three-dimensional coordinates.

Concrete Example Computation of Surface Computer (Instruction Set)

In FIG. 11, a case in which an add instruction is executed is illustrated. In this example, the surface region data SPs (source operand) and the surface region data SPd (destination operand) are added by the surface region unit. That is, the surface region data SPs and SPd are added along with computation data which belong to the mutually matched regions. This processing enables considerably faster computation to be performed. As an instruction set for this surface computer, the instruction set may include conventional instructions such as ADD, SUB, MADD, and MOVE.

(Computing Control)

Figure 19A:
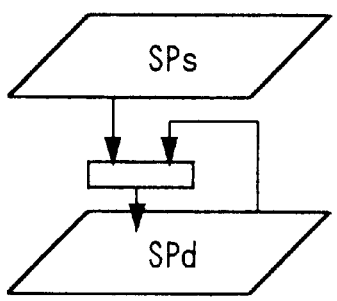
FIGS. 19A, 19B, 19C, and 19D are diagrams illustrating computing processing using two operands, three operands, and four operands.

Cases in which computation control is applied to an instruction having two operands, an instruction having three operands, and an instruction having four operands are shown in FIGS. 19A to 19D, respectively. First, FIG. 19A shows computation control of the two operands. In FIG. 19A, ADD or SUB operation is applied to the source surface region data SPs and the destination surface region $SP_d$.

*ADD:SPd=SPd+SPs*

*SUB:SPd=SPd−SPs*

The resultant data are stored in the address specified by the destination surface. The example shown in FIG. 19A is equivalent to a case in which the products of the elements of the first column of a coefficient matrix ($a_{00}$, $a_{01}$, $a_{02}$, $a_{03}$) and the corresponding elements of a column vector (x, y, z, w) (that is, $a_{00}*x, a_{01}*y, a_{02}*z, a_{03}*w$) are computed and then the total of the resultant products are computed.

Figure 19B:
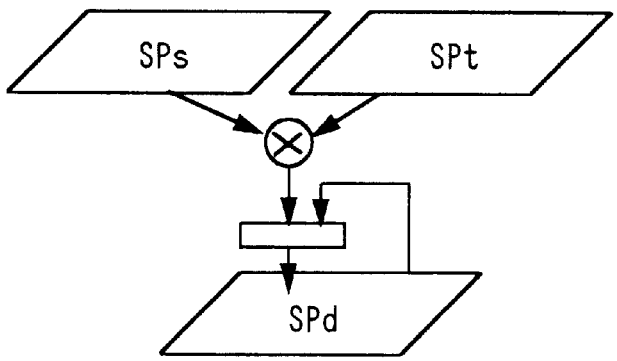
Figure 19C:
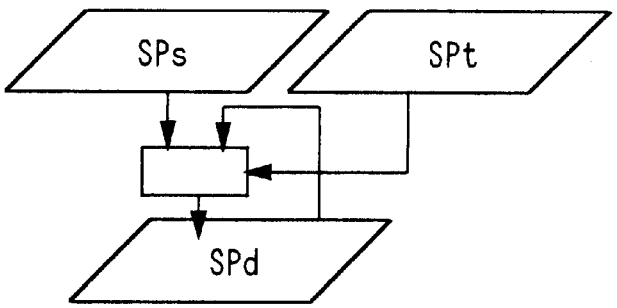

FIGS. 19B and 19C show computing control of the three operands. In FIGS. 19B and 19C, each of MADD (multiply and add) and CMOV (condition move) is applied to computation data in the surface region specified by operands SPd, SPs, and SPt. In FIG. 19B, the following computation is performed.

*MADD:SPd=SPd+SPs×SPt*

SPs×SPt is computed, the product is added to Spd, and then the result is stored at the address specified by the SPd.

In FIG. 19C, SPs and SPt are compared; if a condition (SPs>SPt) is satisfied, SPs is transferred to SPd.

*CMOV.GT: if (SPs>SPt)SPd=SPs*

Figure 19D:
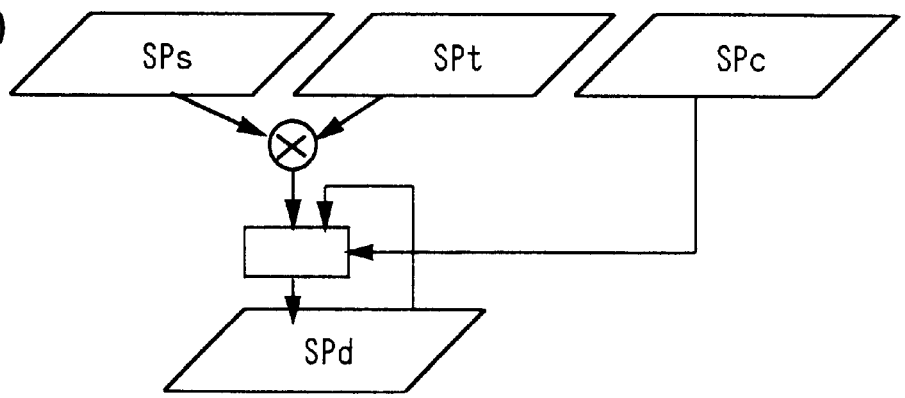

FIG. 19D shows computing control of the four operands. In this example, the MADD and CMOV instructions are applied to each of operands SPd, SPs, SPt, and SPc. Here, SPs and SPt are multiplied, SPd is added to the resultant product, and the result and SPc are compared. If a given condition is satisfied, the value obtained by adding the above product to SPd is set in SPd. The following expression is obtained.

*MADD.CMOV.GT: if (SPd+SPc×SPt>SPc)*

*SPt=SPd+SPs×SPt; else SPd=SPc*

Thus, in the surface computer, even though multiple-operands are used, computation data is transferred and computed at a time along with this surface region. Accordingly, computation efficiency is not lessened. As described above, the surface computer according to the present invention can be constructed so as to have multiple operands, which is appropriate for a multiple pipeline.

Figure 20:
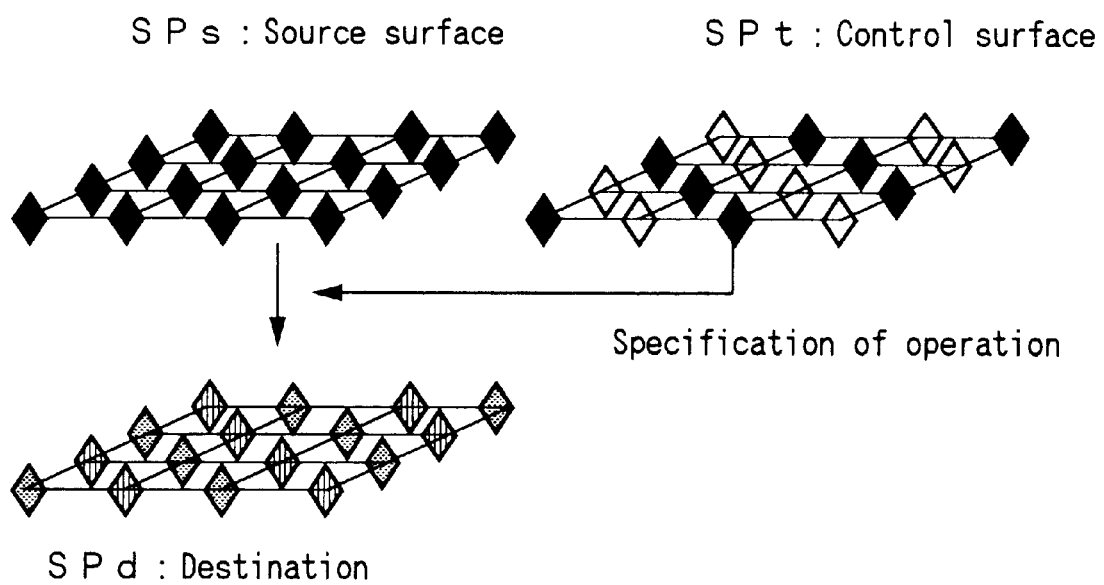
FIG. 20 is a diagram illustrating one example computation of the surface computer.

FIG. 20 shows processing in which a so-called "if-statement" in programming language C is executed. As shown in description of the SIMD-type computer, it leads to complexity in programming in which the same processing is executed by a single instruction as shown in description of the SIMD-type computer. Accordingly, by providing a control surface operand, processing is controlled. In FIG. 20, condition move of three operands SPd, SPc, and SPt is executed using condition-move instructions CMOV and GT. CMOV represents condition move and GT represents greater (comparison). When the control surface region data SPt and the source surface region data SPs are compared, if a condition SPs>SPt is satisfied, data is moved to the destination operand SPd. Thus, the surface computer according to the present invention can switch processing in accordance with the result of computation. As described above, this condition-branch processing can be concurrent processing which takes over the conventional "jump" instruction.

(Condition-branch Instruction)

Figure 21:
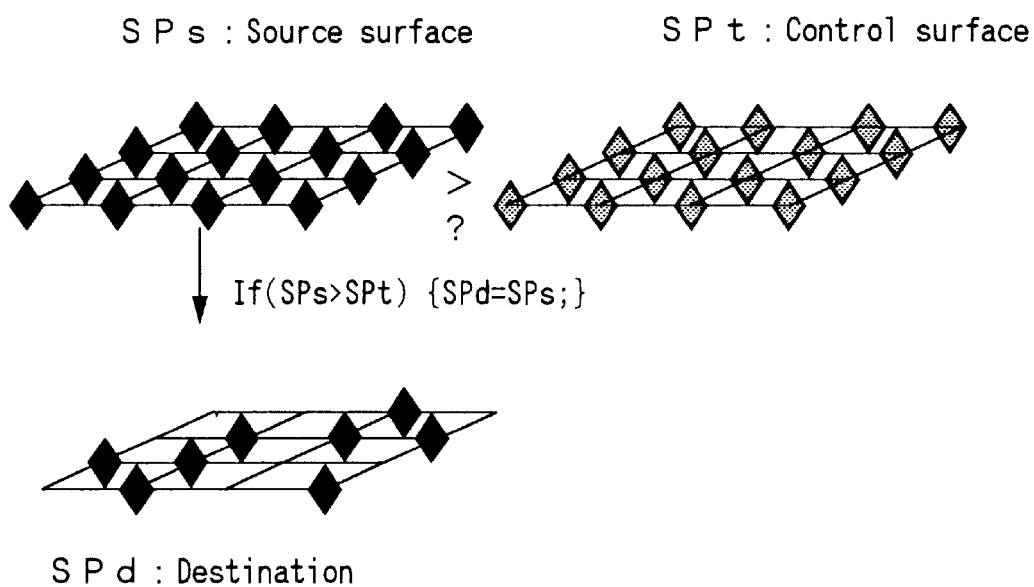
FIG. 21 is a diagram illustrating another example computation of the surface computer.

FIG. 21 shows an example in which the control surface data itself controls an operator. The condition-branch instruction shown in the example is a surface effective instruction EXDT having three operands SPd, SPs, and SPt. Two-operand instruction specified by the control surface data SPt is executed. Thus, when the surface computer performs concurrent processing, condition-branch processing can be performed using control surface data. This example is equivalent to the example shown in FIG. 17 if the control surface data is used as the condition for indicating that a register of the IFDTC 5 is equal to zero and if the destination address of the resultant data is Label 1 in the main memory 7.

In the embodiment, the surface computer according to the present invention is used for large-scale computation in various fields of natural sciences. This surface computer may be used for various simulations and drawings according to three-dimensional animation, which leads to improvement in the speed of processing, usability, and satisfaction of users.

What is claimed is:

1. A surface computer comprising:
   an address generator for generating an address of surface region data and information for adjusting the surface region data stored in a storage region; and
   a concurrent computer, provided at a subsequent stage of said address generator, having a plurality of unit computers responsive to the address and information for processing the surface region data.

2. A surface computer comprising:
   an address generator for generating an address of surface region data and information for adjusting the surface region data stored in a storage region;
   a concurrent computer, provided at a subsequent stage of said address generator, having a plurality of unit computers responsive to the address and information for processing the surface region data; and
   a storage unit connected to said concurrent computer for providing the storage region.

3. A surface computer according to claim 2, wherein said storage unit includes DRAM (dynamic random access memory).

4. A surface computer according to claim 2, wherein said storage unit is connected to said concurrent computer via a data bus having a large bus width.

5. A surface computer comprising:
   an address generator for generating an address of surface region data and information for adjusting the surface region data stored in a storage region; and
   a concurrent computer, provided at a subsequent stage of said address generator, having a plurality of unit computers responsive to the address and information for processing the surface region data, wherein a region specified by an operand constituting an instruction word of the concurrent computer is a line.

6. A surface computer according to claim 5, further comprising a storage unit connected to said concurrent computer for providing the storage region.

7. A surface computer according to claim 6, wherein said storage unit includes DRAM.

8. A surface computer comprising:
   an address generator for generating an address of surface region data and information for adjusting the surface region data stored in a storage region; and
   a concurrent computer, provided at a subsequent stage of said address generator, having a plurality of unit computers responsive to the address and information for processing the surface region data, wherein a region specified by an operand constituting an instruction word of the concurrent computer is a surface region extending two-dimensionally.

9. A surface computer according to claim 8, further comprising a storage unit connected to said concurrent computer for providing the storage region.

10. A surface computer according to claim 9, wherein said storage unit includes DRAM.

11. A surface computer comprising:
   an address generator for generating an address of surface region data and information for adjusting the surface region data stored in a storage region; and
   a concurrent computer, provided at a subsequent stage of said address generator, having a plurality of unit computers responsive to the address and information for processing the surface region data;
   wherein said surface computer is constructed as a one-chip LSI (Large Scale Integration).

12. The surface computer of claim 11, further comprising a storage unit connected to said concurrent computer.

13. The surface computer of claim 11, wherein a region specified by an operand constituting an instruction word is a line.

14. The surface computer of claim 11, wherein a region specified by an operand constituting an instruction word is a surface region extending two-dimensionally.

15. A single chip surface computer comprising:
   a data bus, having a large bus width;
   a processing block; and
   a dynamic random access memory (DRAM) connected to the processing block through the data bus;
   wherein said processing block includes:
      an address generator for generating an address of surface region data and information for adjusting the surface region data stored in the DRAM block; and
      a concurrent computer, provided at a subsequent stage of said address generator, having a plurality of unit computers responsive to the address and information for processing the surface region data.

16. A single chip surface computer according to claim 15, wherein said processing block further includes:
   an instruction fetch and data, transfer controller for controlling retrieval of a surface computing instruction and transfer of the surface region data from a main memory under the control of a CPU; and
   a preprocessor issuing surface region information to said DRAM in accordance with said surface computing instruction.

17. A single chip surface computer according to claim 16, wherein:
   said surface computing instruction comprises an operand, included in an instruction word, for specifying a line region; and
   said surface computer instruction sets line region data as computation data.

18. A single chip surface computer according to claim 16, wherein:
   said surface computing instruction comprises an operand, included in an instruction word, for specifying the surface region data; and
   said surface computing instruction sets the surface region data as computation data.

19. A single chip surface computer according to claim 10, wherein said address generator performs enlargement/reduction on said surface region data.

20. A single chip surface computer according to claim 15, wherein when no data having a corresponding address exists in the surface region data, data having a corresponding address are generated by using one of copy processing, bilinear interpolation processing, and tri-linear interpolation processing.

21. A single chip surface computer according to claim 15, wherein said concurrent computer is constructed using a super pipeline architecture.

22. A single chip surface computer according to claim 15, wherein said concurrent computer is constructed using a superscalar architecture.

23. A single chip surface computer according to claim 15, wherein said surface computer is coupled with a CPU and a main memory outside thereof and serves as a coprocessor of said CPU.

24. A method for use in a surface computer including an address generator, a concurrent computer comprising a plurality of unit computers, a storage block, and a data bus having a large bus width and connecting said concurrent computer and said storage block therebetween, said method comprising:
   causing said address generator to generate an address of surface region data and information for adjusting the surface region data stored in the storage block; and
   causing said concurrent computer to process said surface region data responsive to the address and information.

25. A method for use in a surface computer according to claim 24, wherein said address generator performs enlargement/reduction on said surface region data.

26. A method for use in a surface computer according to claim 24, wherein one of line data and said surface region data is specified by an operand constituting an instruction word of said concurrent computer.

27. A method for use in a surface computer according to claim 24, wherein line data is represented by a pair of mutually different points specified by an operand of said concurrent computer.

28. A method for use in a surface computer according to claim 24, wherein said surface region data is represented by a point and a line which has said point set as a base point, said point and said line being specified by an operand of said concurrent computer.

29. A method for use in a surface computer according to claim 24, wherein said surface region data is represented by a plurality of points specified by an operand of said concurrent computer.

* * * * *

UNITED STATES PATENT AND TRADEMARK OFFICE
CERTIFICATE OF CORRECTION

PATENT NO. : 6,631,457 B1
DATED : October 7, 2003
INVENTOR(S) : Akio Ohba

It is certified that error appears in the above-identified patent and that said Letters Patent is hereby corrected as shown below:

<u>Column 14,</u>
Line 46, after "the" delete "–".

<u>Column 19,</u>
Line 46, after "data" delete ",".

<u>Column 20,</u>
Line 8, "10" should read -- 15 --.

Signed and Sealed this

Twenty-seventh Day of January, 2004

JON W. DUDAS
*Acting Director of the United States Patent and Trademark Office*